US012731943B2

(12) United States Patent
Su

(10) Patent No.: US 12,731,943 B2
(45) Date of Patent: Sep. 8, 2026

(54) ELECTRICAL CONNECTION DEVICE

(71) Applicant: Molex, LLC, Lisle, IL (US)

(72) Inventor: Yu-Sheng Su, New Taipei City (TW)

(73) Assignee: Molex, LLC, Lisle, IL (US)

( * ) Notice: Subject to any disclaimer, the term of this patent is extended or adjusted under 35 U.S.C. 154(b) by 300 days.

(21) Appl. No.: 18/517,004

(22) Filed: Nov. 22, 2023

(65) Prior Publication Data

US 2024/0170888 A1 May 23, 2024

(30) Foreign Application Priority Data

Nov. 23, 2022 (CN) ......................... 202211471880.1

(51) Int. Cl.
*H01R 13/627* (2006.01)
*H01R 24/38* (2011.01)

(52) U.S. Cl.
CPC ......... *H01R 13/6271* (2013.01); *H01R 24/38* (2013.01)

(58) Field of Classification Search
CPC ............................ H01R 13/6271; H01R 24/38
USPC ................................. 439/578, 353, 357, 350
See application file for complete search history.

(56) References Cited

U.S. PATENT DOCUMENTS 7,455,550 B1 * 11/2008 Sykes .................. H01R 13/506 439/578
2014/0017928 A1 * 1/2014 Shah ...................... H01R 24/40 439/350
2017/0324193 A1 * 11/2017 Watkins ............. H01R 13/6584
2019/0020149 A1 1/2019 Wu et al.

FOREIGN PATENT DOCUMENTS

| | | | |
|---|---|---|---|
| CN | 2862420 | Y | 1/2007 |
| CN | 2882031 | Y | 3/2007 |
| CN | 102035114 | A | 4/2011 |
| CN | 101740894 | B | 7/2012 |
| CN | 207504225 | U | 6/2018 |
| CN | 208209196 | U | 12/2018 |
| CN | 110611192 | A | 12/2019 |
| CN | 209786238 | U | 12/2019 |
| CN | 210779263 | U | 6/2020 |
| CN | 111430958 | B | 6/2021 |
| CN | 213936646 | U | 8/2021 |
| CN | 216015916 | U | 3/2022 |
| CN | 217281536 | U | 8/2022 |
| JP | S59207574 | A | 11/1984 |

(Continued)

*Primary Examiner* — Gary F Paumen

(57) ABSTRACT

An electrical connection device includes a plug connector. The plug connector includes a conductive body, an outer conductor, an insulative body and a central terminal. The outer conductor has a rear end, a front latching portion and an elastic piece. The rear end electrically connects the conductive body, the front latching portion is opposite to the rear end and is positioned in front of the rear end, the elastic piece is positioned between the rear end and the front latching portion and connects the front latching portion. At least one of the conductive body and the outer conductor is formed with a stopping surface, a position of the stopping surface correspond to the elastic piece of the outer conductor and is close to the front latching portion. The electrical connection device assures and avoids interruption of power and signal transfer.

20 Claims, 32 Drawing Sheets

(56) References Cited

FOREIGN PATENT DOCUMENTS

| | | | |
|---|---|---|---|
| JP | 2001508231 | A | 6/2001 |
| TW | M339847 | U | 9/2008 |
| TW | M534915 | U | 1/2017 |
| TW | M554237 | U | 1/2018 |
| TW | M624263 | U | 3/2022 |

* cited by examiner

ELECTRICAL CONNECTION DEVICE

CROSS-REFERENCE TO RELATED APPLICATIONS

This application claims the benefit of and priority to Chinese Patent Application No. CN 202211471880.1, filed on Nov. 23, 2022, titled "Electrical Connection Device," the entire contents of which is hereby incorporated herein by reference.

TECHNICAL FIELD

The present disclosure relates to an electrical connection device, and particularly relates to an electrical connection device in which a coaxial connector mates with a mating connector.

BACKGROUND

Existing micro-miniature coaxial (MMCX) connector latches to a conductive body generally by a C-shaped latching ring acted as a latching structure which is locked to a mating connector.

When the micro-miniature coaxial connector mates with the mating connector and is under vibrating, because the C-shaped latching ring and the conductive body have a gap therebetween, the C-shaped latching ring and the conductive body are very prone to generate instantaneous interruption of power or interruption of signal in transferring a current or a signal, which in turn causes the function of the C-shaped latching ring and the conductive body to fail. Because the conductive body and the mating connector also have a gap therebetween, it is very prone to cause the micro-miniature coaxial connector to shake relative to the mating connector, which causes stability of the transferring not to be good. Moreover, because a length of the C-shaped latching ring is short and elasticity of the C-shaped latching ring is not good, in a process of repeated inserting and pulling out of the micro-miniature coaxial connector, the C-shaped latching ring is prone to generate elastic fatigue to make the C-shaped latching ring deformed, so that stability of the transferring is influenced and even instantaneous interruption of power or interruption of signal occurs. Based the reasons as above, the existing micro-miniature coaxial connector, for example a connector disclosed in Chinese patent document CN207504225U, cannot be applied in a circumstance which requires to apply a current and performs transferring, for example sound source equipment or automotive rearview mirror fatigue detection and so on.

In order to overcome the problem of instantaneous interruption of power or interruption of signal, some connectors, for example, a connector disclosed in Chinese patent document CN209786238U, provide the latching structure to a front end of the micro-miniature coaxial connector. However, such a structure cannot be adapted to the existing mating connector which conforms to MMCX specification. Accordingly, a new mating connector is redesigned to perform matching, which causes manufacturing cost to be increased.

SUMMARY

Therefore, an object of the present disclosure is to provide an electrical connection device which can overcome at least one deficiency of the prior art.

Accordingly, an electrical connection device of the present disclosure comprises a plug connector. The plug connector comprises a conductive body, an outer conductor, an insulative body and a central terminal. The outer conductor has a rear end, at least one front latching portion and at least one elastic piece. The rear end electrically connects the conductive body, the front latching portion is opposite to the rear end and is positioned in front of the rear end, the elastic piece is positioned between the rear end and the front latching portion and connects the front latching portion. At least one of the conductive body and the outer conductor is formed with a stopping surface, a position of the stopping surface corresponds to the elastic piece of the outer conductor and is close to the front latching portion. The insulative body is provided in the conductive body. The central terminal is provided in the insulative body.

In some embodiments, the elastic piece is formed with the stopping surface.

In some embodiments, the elastic piece has a shoulder, the shoulder has a shoulder surface, the shoulder surface forms the stopping surface.

In some embodiments, the conductive body has an annular surrounding wall which extends forwardly and surrounds the elastic piece, the annular surrounding wall has a front end surface, the front end surface forms the stopping surface.

In some embodiments, the elastic piece has a shoulder, the shoulder has a shoulder surface, the conductive body has an annular surrounding wall which extends forwardly and surrounds the elastic piece, the annular surrounding wall has a front end surface, the shoulder surface and the front end surface together form the stopping surface.

In some embodiments, the outer conductor is formed with at least one slit, the slit extends from the front latching portion to be close to the rear end, the slit has an opened portion which is positioned to the front latching portion and a closed portion which is opposite to the opened portion and closes to the rear end.

In some embodiments, the outer conductor has a plurality of front latching portions and a plurality of elastic pieces and is formed with a plurality of slits, each slit extends from the two corresponding adjacent front latching portions to be close to the rear end, each slit is positioned between the two corresponding adjacent front latching portions and between the two corresponding adjacent elastic pieces.

In some embodiments, the outer conductor is further formed with a penetrating gap, the penetrating gap extends from the two corresponding adjacent front latching portions to the rear end, the penetrating gap has two through opening portions, the two through opening portions are respectively positioned between the two corresponding adjacent front latching portions and at the rear end.

In some embodiments, the outer conductor is formed with a penetrating gap, the penetrating gap extends from the front latching portion to the rear end, the penetrating gap has two through opening portions which are respectively positioned to the front latching portion and the rear end.

In some embodiments, the conductive body is a single-piece component and is formed with an annular recessed groove which is opened outwardly, the outer conductor sheathes the conductive body and is formed with a penetrating gap, the penetrating gap extends from the front latching portion to the rear end, the outer conductor has an inner flange which is connected to the rear end, the inner flange snaps to the annular recessed groove and applies an elastic force to clamp the conductive body.

In some embodiments, the conductive body is a single-piece component, the rear end of the outer conductor is integrally connected to the conductive body, the outer conductor and the conductive body are integrally formed and together constitute a single-piece component, the insulative body has a providing segment which is provided in the conductive body and the outer conductor and a head segment which is formed to a front end of the providing segment and protrudes from a front end of the front latching portion.

In some embodiments, the conductive body is a single-piece component and is formed with an annular channel which is opened forwardly, the outer conductor is formed with a penetrating gap which extends from the front latching portion to the rear end, the outer conductor sheathes the conductive body and applies an elastic force to clamp the conductive body, the rear end and the elastic piece are received in the annular channel, the front latching portion is exposed from the annular channel.

In some embodiments, the outer conductor has a plurality of front latching portions and a plurality of elastic pieces and is formed with a plurality of slits, the penetrating gap extends from the two corresponding adjacent front latching portions to the rear end, each slit extends from the two corresponding adjacent front latching portions to be close to the rear end, each slit is positioned between the two corresponding adjacent front latching portions and between the two corresponding adjacent elastic pieces, each elastic piece has a first elastic piece body which is connected to the corresponding front latching portion and a second elastic piece body which extends rearwardly from the first elastic piece body and applies an elastic force to abut against the conductive body.

In some embodiments, the conductive body is a single-piece component and is formed with an annular channel which is opened forwardly, the outer conductor further has an outer flange which is connected to the rear end, the outer conductor sheathes the conductive body and the rear end and the outer flange are received in the annular channel, the conductive body has an annular latch pressuring wall which extends forwardly and surrounds the annular channel, a front end of the annular latch pressuring wall is deformed to bend inwardly and latch and press against the outer flange.

In some embodiments, the conductive body has a first conductive member and a second conductive member which is provided in the first conductive member and partially protrudes from a front end of the first conductive member, the first conductive member and the second conductive member together define an annular channel which is opened forwardly, the outer conductor further has an outer flange which is connected to the rear end, the rear end, the elastic piece and the outer flange are received in the annular channel, the front latching portion is exposed from the annular channel and protrudes from the front end of the first conductive member, the outer flange is clamped by the first conductive member and the second conductive member.

In some embodiments, the conductive body has a first conductive member, a second conductive member which is provided in the first conductive member and partially protrudes from a front end of the first conductive member, and a third conductive member which is provided in the first conductive member and partially protrudes from a rear end of the first conductive member, the first conductive member and the second conductive member together define an annular channel which is opened forwardly, the outer conductor further has an outer flange which is connected to the rear end of the outer conductor, the rear end of the outer conductor, the elastic piece and the outer flange are received in the annular channel, the front latching portion is exposed from the annular channel and protrudes from the front end of the first conductive member, the outer flange is clamped by the first conductive member and the second conductive member.

In some embodiments, the conductive body has a first conductive member and a second conductive member, the rear end of the outer conductor is integrally connected to the first conductive member, the outer conductor and the first conductive member are integrally formed and together constitute a single-piece component, the second conductive member is provided in the first conductive member and the outer conductor and partially protrudes from a front end of the front latching portion.

In some embodiments, the conductive body has a first conductive member and a second conductive member, the rear end of the outer conductor is integrally connected to the first conductive member, the outer conductor and the first conductive member are integrally formed and together constitute a single-piece component, the second conductive member is provided in the first conductive member and the outer conductor and partially protrudes from a front end of the front latching portion, the insulative body has a providing segment which is provided in the second conductive member and a head segment which is formed to a front end of the providing segment and protrudes from a front end of the second conductive member.

In some embodiments, the conductive body has a first conductive member and a second conductive member, the rear end of the outer conductor is integrally connected to the first conductive member, the outer conductor and the first conductive member are integrally formed and together constitute a single-piece component, the second conductive member is provided in the first conductive member and the outer conductor and partially protrudes from a front end of the front latching portion, the first conductive member has an inner interfering circumferential wall which interferes with the second conductive member.

In some embodiments, the conductive body has a first conductive member and a second conductive member which is provided in the first conductive member and partially protrudes from a front end of the first conductive member, the first conductive member has an inner interfering circumferential wall, the second conductive member interferes with the inner interfering circumferential wall and is formed with an annular recessed groove which is opened outwardly, the first conductive member and the second conductive member together define an annular channel which is opened forwardly and is communicated the annular recessed groove, the outer conductor sheathes the second conductive member and is formed with a penetrating gap, the penetrating gap extends from the front latching portion to the rear end, the outer conductor further has an inner flange which is connected to the rear end, the rear end, the elastic piece and the inner flange are received in the annular channel, the front latching portion is exposed from the annular channel, the inner flange snaps to the annular recessed groove and applies an elastic force to clamp the second conductive member.

In some embodiments, a front end of the front latching portion has a front abutting surface.

In some embodiments, the front latching portion is a protrusion, the central terminal is a male terminal, the electrical connection device further comprises a receptacle connector, the receptacle connector comprises an outer shell, an insulator which is provided in the outer shell, and a female terminal which is provided in the insulator and is used to electrically connect the central terminal, the outer shell is formed with an inner annular groove which is used to allow the front latching portion to latch thereto, the outer shell has a mating end surface which is used to allow the stopping surface to abut thereagainst, when the plug connector mates with the receptacle connector, the front latching portion latches to the inner annular groove, the stopping surface tightly abuts against the mating end surface.

In some embodiments, the outer shell further has a front inner conical surface which surrounds the inner annular groove, is spaced apart from the mating end surface and is positioned in front of the mating end surface, the front latching portion has an arc surface, when the plug connector mates with the receptacle connector, the arc surface latches to the front inner conical surface and applies a thrust to the front inner conical surface so as to urge the stopping surface to tightly abut against the mating end surface.

In some embodiments, the outer shell further has a front stopping surface which is spaced apart from the front inner conical surface, is positioned in front of the front inner conical surface and surrounds the inner annular groove, the front latching portion further has a front abutting surface which is connected to a front end of the arc surface and is used to abut against the front stopping surface, when the plug connector mates with the receptacle connector, the front abutting surface tightly abuts against the front stopping surface.

The present disclosure at least has the following effect: by that the outer conductor and the conductive body will not generate a gap therebetween, the stopping surface and the mating end surface will not generate a gap therebetween, and each elastic piece has better elasticity, endure repeated inserting and pulling out and is not prone to deform, stability of transferring of a current or a signal can be assured, occurring of instantaneous interruption of power or interruption of signal also can be avoided.

BRIEF DESCRIPTION OF THE DRAWINGS

Other features and effects of the present disclosure will be apparent from embodiments with reference to the drawings, in which.

DETAILED DESCRIPTION

Figure 1:
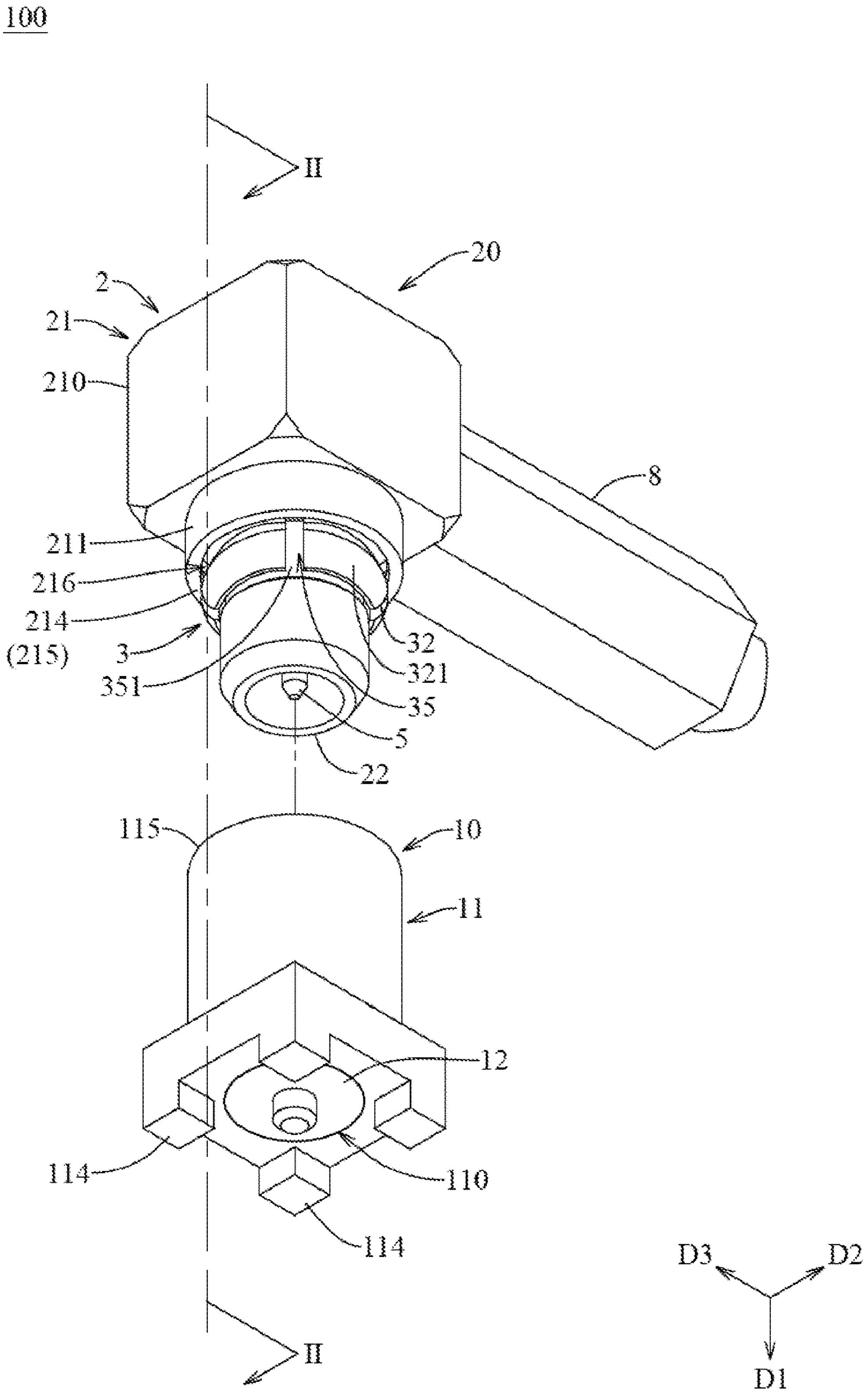
FIG. 1 is a perspective exploded view of a first embodiment of an electrical connection device of the present disclosure illustrating an assembling relationship of a receptacle connector and a plug connector.

Before the present disclosure is described in detail, it is noted that the similar elements are indicated by the same reference numerals in the following description.

Referring to FIG. 1, a first embodiment of an electrical connection device 100 of the present disclosure includes a receptacle connector 10 and a plug connector 20 which is used to mate with the receptacle connector 10.

For sake of convenience of the later description, in the electrical connection device 100, a first direction D1, a second direction D2 which is perpendicular to the first direction D1 and a third direction D3 which is perpendicular to the first direction D1 and the second direction D2 are defined. In the first embodiment, the first direction D1 takes a front-rear direction as an example, a direction to which an arrow of FIG. 1 points is front and a direction opposite to front is rear; the second direction D2 takes a left-right direction as an example, a direction to which an arrow of FIG. 1 points is left and a direction opposite to left is right;

and the third direction D3 takes an up-down direction as an example, a direction to which an arrow of FIG. 1 points is up and a direction opposite to up is down.

Figure 2:
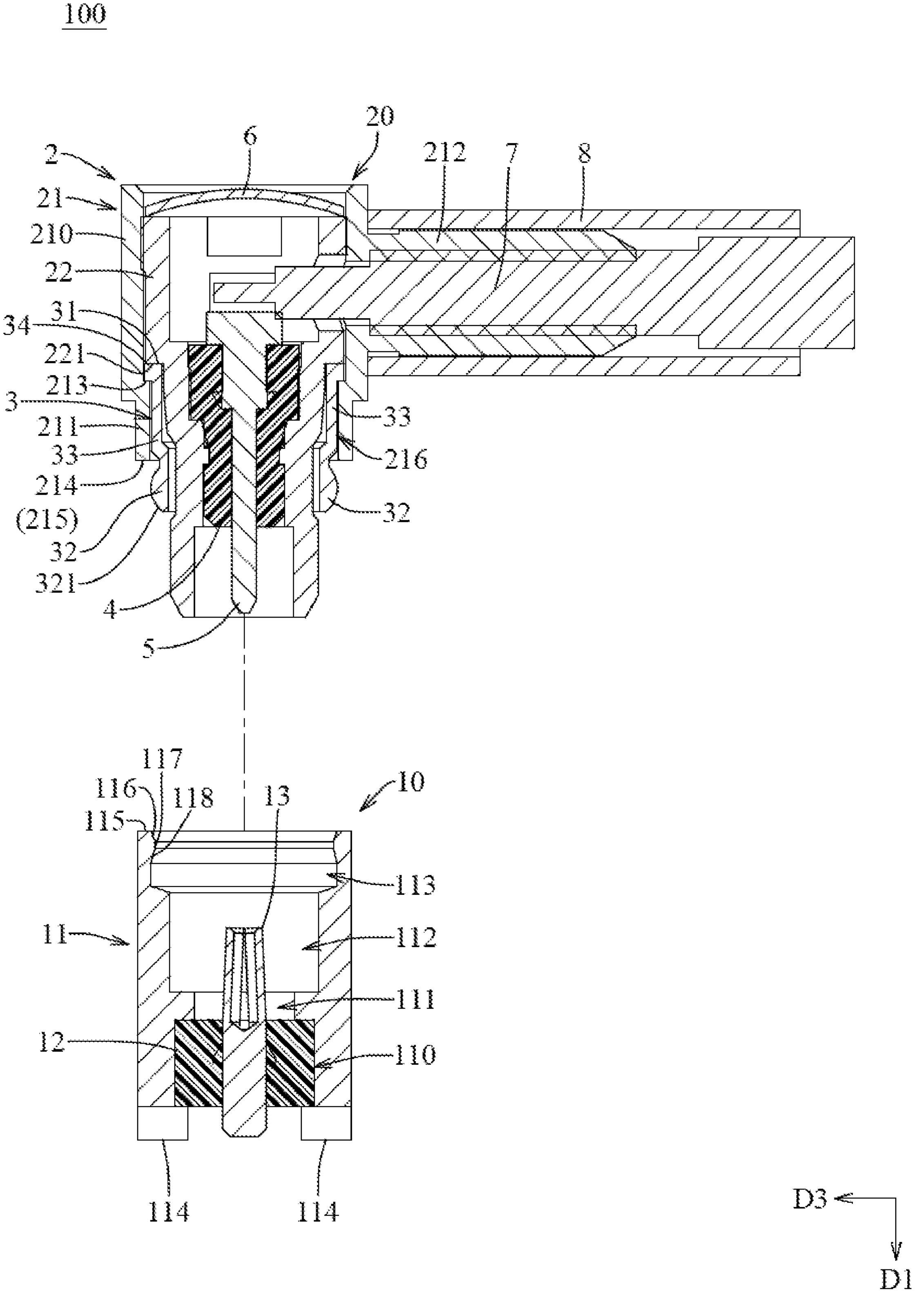
FIG. 2 is an exploded cross sectional view taken along a line II-II of FIG. 1.
Figure 3:
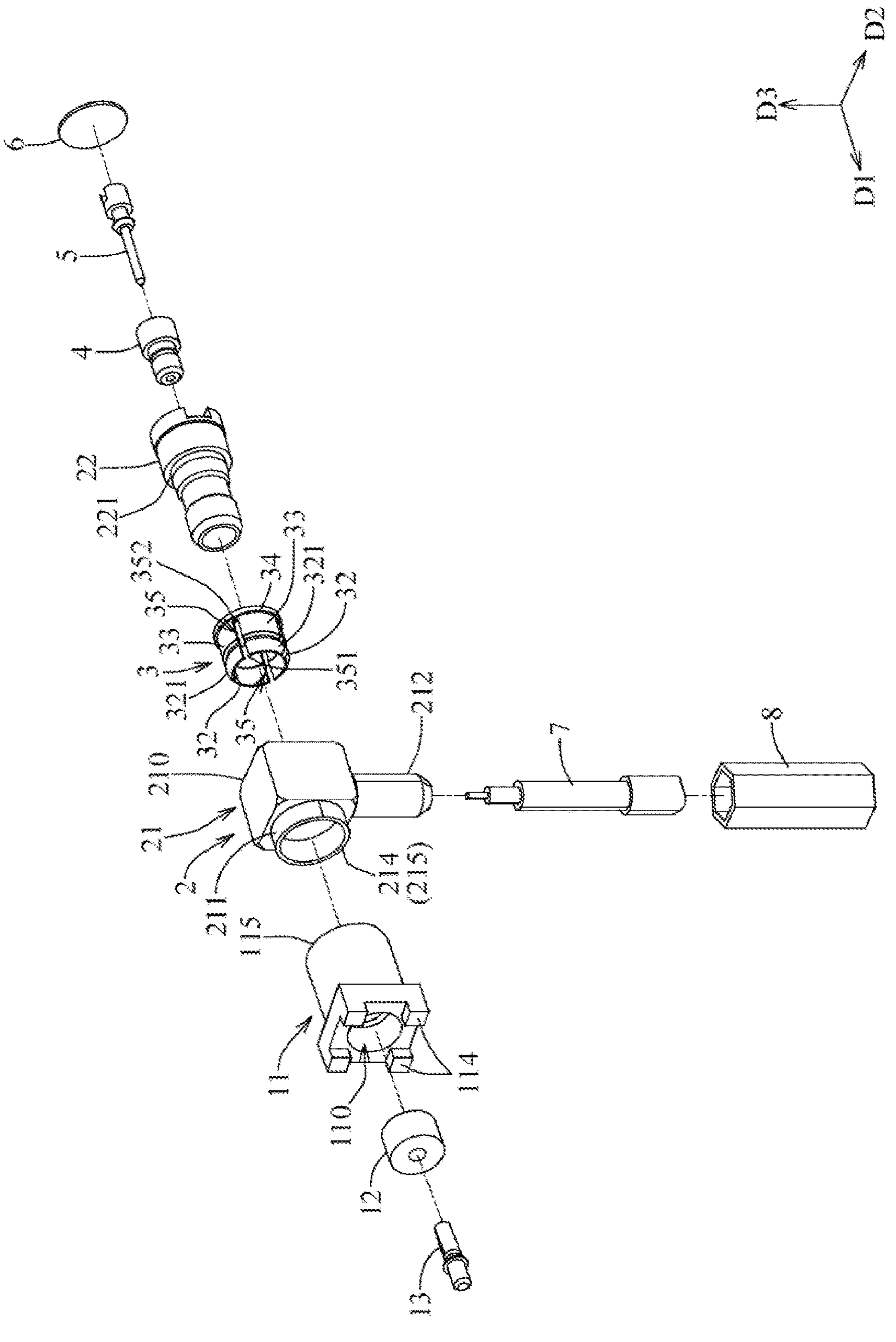
FIG. 3 is a perspective exploded view of the first embodiment.
Figure 4:
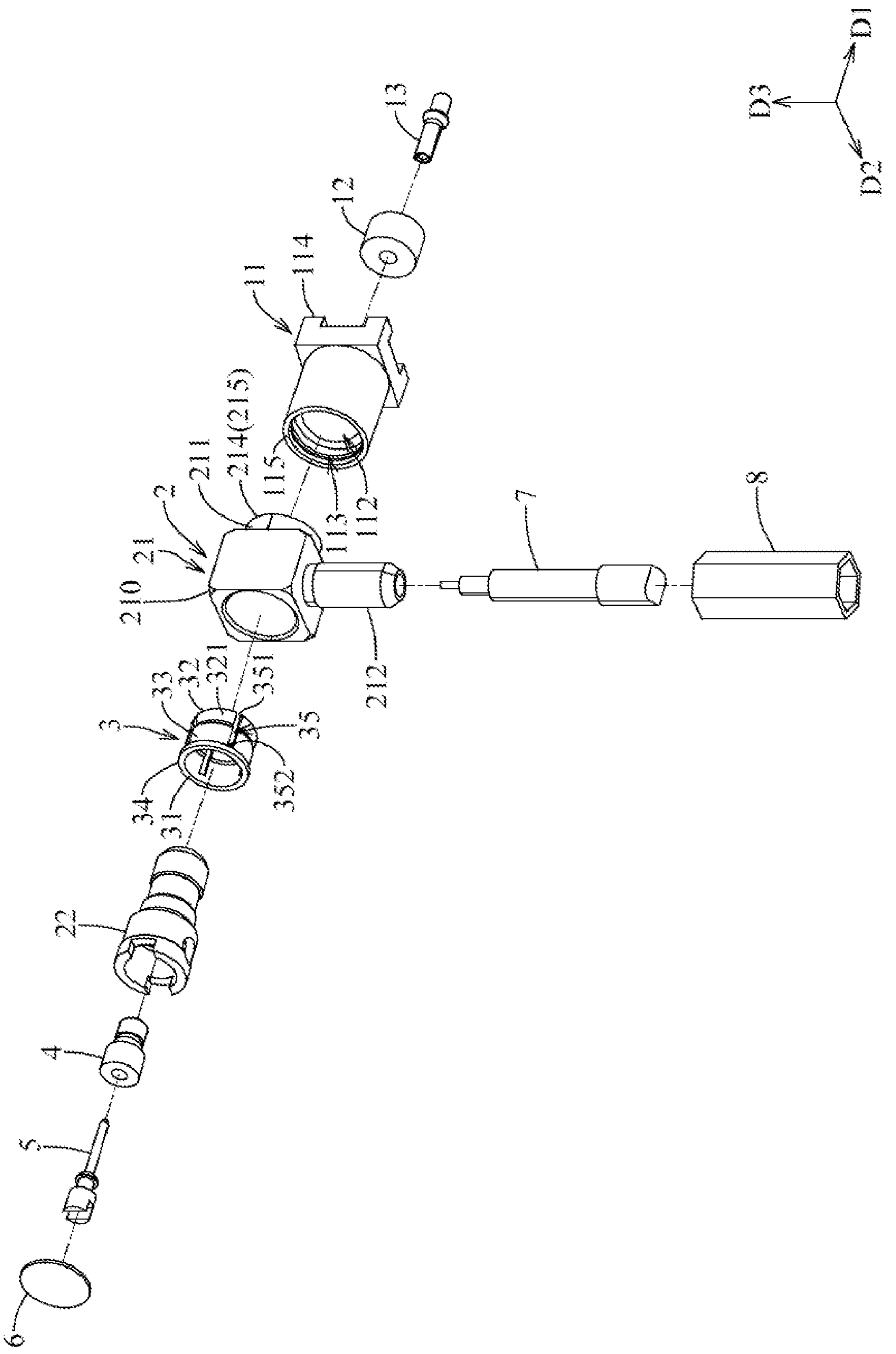
FIG. 4 is a perspective exploded view of the first embodiment viewed from another angle.

Referring to FIG. 2, FIG. 3 and FIG. 4, the receptacle connector 10 includes an outer shell 11, an insulator 12 and a female terminal 13. For example, the outer shell 11 is a conductor made of a metal material. The outer shell 11 is formed with a positioning groove 110, a through hole 111 which is communicated with a rear end of the positioning groove 110, an insertion groove 112 which is communicated with a rear end of the through hole 111, and an inner annular groove 113 which is communicated with an outer periphery of the insertion groove 112 and is adjacent to a rear end of the insertion groove 112. The positioning groove 110 is used to allow the insulator 12 to be received therein. The insertion groove 112 and the inner annular groove 113 are used to allow the plug connector 20 to insert therein.

The outer shell 11 has a plurality of connecting blocks 114, a mating end surface 115, a rear inner conical surface 116, an inner annular surface 117 and a front inner conical surface 118. The plurality of connecting blocks 114 are toward the front and for example can be welded to a circuit board (not shown) by welding. The mating end surface 115 is in form of annular shape, is toward the rear, and is opposite to the plurality of connecting blocks 114. The mating end surface 115 is spaced apart from the inner annular groove 113 by a certain distance along the first direction D1, and is used to allow the plug connector 20 to abut thereagainst. The rear inner conical surface 116 obliquely extends forwardly and inwardly from an inner edge of the mating end surface 115. The inner annular surface 117 extends forwardly from a front edge of the rear inner conical surface 116. The front inner conical surface 118 obliquely extends forwardly and outwardly from a front edge of the inner annular surface 117 and surrounds the inner annular groove 113.

The insulator 12 is provided in the positioning groove 110 of the outer shell 11. The female terminal 13 is provided in the insulator 12 and the through hole 111 of the outer shell 11 and partially extends into the insertion groove 112.

The plug connector 20 includes a conductive body 2, an outer conductor 3, an insulative body 4, a central terminal 5, a cover 6, a cable 7 and a bushing 8. The conductive body 2 and the outer conductor 3 are conductors made of for example a metal material. The outer conductor 3 has a rear end 31, at least one front latching portion 32 and at least one elastic piece 33. The rear end 31 electrically connects the conductive body 2. The front latching portion 32 is opposite to the rear end 31 and is positioned in front of the rear end 31. The elastic piece 33 is positioned between the rear end 31 and the front latching portion 32 and connects the front latching portion 32. At least one of the conductive body 2 and the outer conductor 3 is formed with a stopping surface, a position of the stopping surface corresponds to the elastic piece 33 of the outer conductor 3 and is close to the front latching portion 32. The stopping surface is used to stop the mating end surface 115 of the receptacle connector 10 so as to limit a depth that the plug connector 20 inserts into the receptacle connector 10.

In the first embodiment, the plug connector 20 is a right-angle connector. The conductive body 2 has a first conductive member 21 and a second conductive member 22. The first conductive member 21 has an outer casing 210, an annular surrounding wall 211 and a guiding post 212. The outer casing 210 is in form of hollow square shell shape, an interior of the outer casing 210 has a rear stopping surface 213 which is toward the rear. The annular surrounding wall 211 extends forwardly from a front end of the outer casing 210 and has a front end surface 214, the front end surface 214 forms a stopping surface 215 which is to be used to abut against the mating end surface 115. The guiding post 212 is in form of hollow cylinder shape and extends downwardly from a bottom end of the outer casing 210. The second conductive member 22 is in form of annular barrel shape and is assembled to the outer casing 210 of the first conductive member 21 from rear to front, the second conductive member 22 is provided in the outer casing 210 and the annular surrounding wall 211 and partially protrudes from the front end surface 214. The second conductive member 22 has an annular surface 221 which is toward the front, is spaced apart from the rear stopping surface 213 and is positioned behind the rear stopping surface 213. The first conductive member 21 and the second conductive member 22 together define an annular channel 216 which is opened forwardly.

In the first embodiment, the outer conductor 3 is a component which is formed by stamping and is in form of collar shape. The outer conductor 3 has a plurality of front latching portions 32, a plurality of elastic pieces 33 and an outer flange 34. The plurality of front latching portions 32 are arranged as a ring shape and the plurality of elastic pieces 33 are arranged as a ring shape. Each front latching portion 32 is a protrusion which is connected to a front end of the corresponding elastic piece 33 and is used to latch to the inner annular groove 113 of the receptacle connector 10. Each front latching portion 32 has an arc surface 321 which is used to latch to the front inner conical surface 118. The outer flange 34 is connected to the rear end 31. The outer conductor 3 is formed with a plurality of slits 35, each slit 35 extends from the two corresponding adjacent front latching portions 32 to be close to the rear end 31, and each slit 35 is positioned between the two corresponding adjacent front latching portions 32 and between the two corresponding adjacent elastic pieces 33. Each slit 35 has an opened portion 351 which is positioned between the two corresponding adjacent front latching portions 32 and a closed portion 352 which is opposite to the opened portion 351 and is close to the rear end 31.

The outer conductor 3 is assembled to the outer casing 210 of the first conductive member 21 from rear to front, the outer conductor 3 is provided in the outer casing 210 and the annular surrounding wall 211 and partially protrudes from the front end surface 214. The rear end 31, the plurality of elastic pieces 33 and the outer flange 34 of the outer conductor 3 are received in the annular channel 216. The outer flange 34 is clamped by the rear stopping surface 213 of the first conductive member 21 and the annular surface 221 of the second conductive member 22. The plurality of front latching portions 32 are exposed from the annular channel 216 and protrude from the front end surface 214 of the first conductive member 21.

The insulative body 4 is provided in the second conductive member 22 of the conductive body 2. The central terminal 5 is a male terminal which is provided in the insulative body 4. The central terminal 5 protrudes from a front end and a rear end of the insulative body 4, and is used to be electrically connected to the female terminal 13 of the receptacle connector 10. The cover 6 is assembled in the outer casing 210 of the first conductive member 21 and closes a rear end of the outer casing 210. The cable 7 is provided in the outer casing 210 and the guiding post 212 of the first conductive member 21 and is electrically connected to the central terminal 5. The bushing 8 sheathes the guiding post 212 of the first conductive member 21 and is used to cover a connected location between the cable 7 and the guiding post 212.

By that the outer flange 34 of the outer conductor 3 is clamped by the rear stopping surface 213 of the first conductive member 21 and the annular surface 221 of the second conductive member 22, the outer flange 34 can be firmly fixed between the first conductive member 21 and the second conductive member 22 and a contact state among the outer flange 34, the first conductive member 21 and the second conductive member 22 is held, so as to avoid a gap generating between the outer flange 34 and the first conductive member 21 or a gap generating between the outer flange 34 and the second conductive member 22. Therefore, stability of transferring of a current or a signal over the outer conductor 3 and the conductive body 2 can be assured, so as to avoid instantaneous interruption of power or interruption of signal occurring. Moreover, by that only the plurality of front latching portions 32 of the outer conductor 3 are exposed from the annular channel 216 and all the remaining locations of the outer conductor 3 are received in the annular channel 216, the second conductive member 22 and the first conductive member 21 of the conductive body 2 can function to protect the plurality of elastic pieces 33 respectively from an inner side of the plurality of elastic pieces 33 and an outer side of the plurality of elastic pieces 33. Therefore, it can prevent the plurality of elastic pieces 33 from being damaged due to human factor influence.

Figure 5:
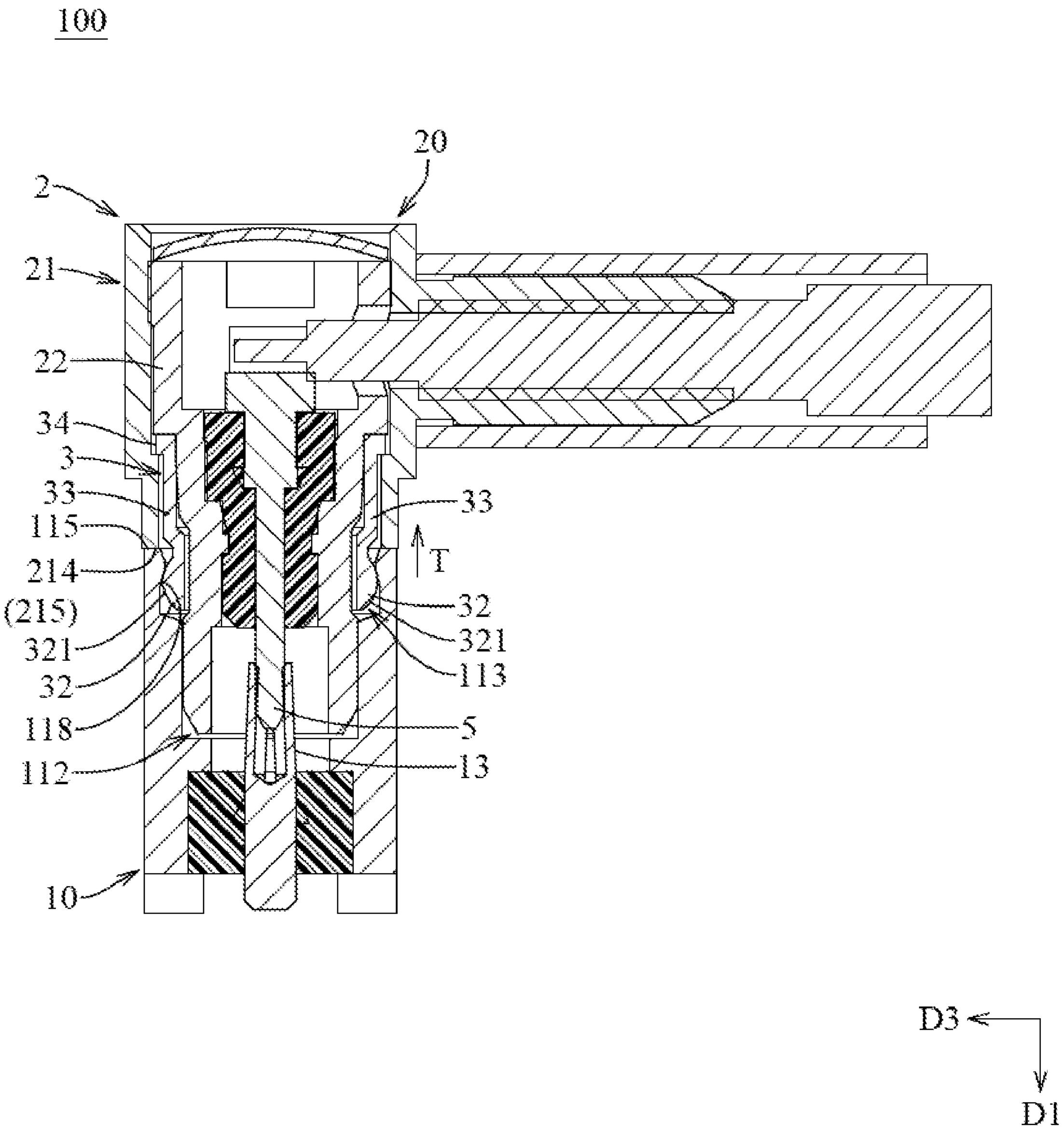
FIG. 5 is a cross sectional view similar to FIG. 2 illustrating that the plug connector mates with the receptacle connector.

Referring to FIG. 2 and FIG. 5, when the plug connector 20 mates with the receptacle connector 10, a part of the second conductive member 22 of the plug connector 20 which protrudes from the front end surface 214 and the plurality of front latching portions 32 of the outer conductor 3 are respectively aligned with the insertion groove 112 and the rear inner conical surface 116 of the receptacle connector 10. Next, the plug connector 20 is moved toward the receptacle connector 10 along the first direction D1. In a process of movement of the plug connector 20, the part of the second conductive member 22 which protrudes from the front end surface 214 will firstly insert into the insertion groove 112. Subsequently, the arc surface 321 of each front latching portion 32 will contact the rear inner conical surface 116 and will be obstructed by the rear inner conical surface 116. An acting force applied to the arc surface 321 by the rear inner conical surface 116 will urge the front latching portion 32 to bring the corresponding elastic piece 33, which is connected with the front latching portion 32, to displace and flexibly deform toward the second conductive member 22 and accumulate an elastic restoring force, so that the plurality of arc surfaces 321 of the plurality of front latching portions 32 can move forwardly along the rear inner conical surface 116. At the same time, the central terminal 5 will insert into the female terminal 13 and will be electrically connected with the female terminal 13. Then, the plurality of arc surfaces 321 will leave the rear inner conical surface 116 and contact the inner annular surface 117.

When the plurality of arc surfaces 321 leave the inner annular surface 117 and move to the inner annular groove 113, the elastic restoring force accumulated by each elastic piece 33 will bring the corresponding front latching portion 32, which is connected with the elastic piece 33, to restore, so that each front latching portion 32 can automatically latch to the inner annular groove 113 and latch to the front inner conical surface 118 by means of the arc surface 321. When the arc surface 321 of each front latching portion 32 latches to the front inner conical surface 118, the arc surface 321 will apply a thrust T, which is parallel to the first direction D1 and is toward the rear, to the front inner conical surface 118, so as to urge the stopping surface 215 to tightly abut against the mating end surface 115. Therefore, that the stopping surface 215 and the mating end surface 115 generate a gap therebetween can be avoided, thus the plug connector 20 can firmly mate with the receptacle connector 10 and will not shake relative to the receptacle connector 10, so that stability in transferring a current or a signal can be promoted.

When the plug connector 20 is pulled out from the receptacle connector 10, a force is applied along the first direction D1 to pull the plug connector 20 rearwardly. Because the arc surface 321 of each front latching portion 32 is obstructed by the front inner conical surface 118, an acting force applied to the arc surface 321 by the front inner conical surface 118 will urge the front latching portion 32 to bring the corresponding elastic piece 33, which is connected with the front latching portion 32, to displace and flexibly deform toward the second conductive member 22 and accumulate an elastic restoring force, thus the plurality of arc surfaces 321 of the plurality of front latching portions 32 can be moved rearwardly along the front inner conical surface 118. When the plurality of arc surfaces 321 sequentially leave the front inner conical surface 118 and the inner annular surface 117, the elastic restoring force accumulated by each elastic piece 33 will bring the corresponding front latching portion 32, which is connected with the elastic piece 33, to restore, so that each front latching portion 32 automatically restores to an initial position shown in FIG. 2.

Referring to FIG. 1 and FIG. 3, by that each slit 35 of the outer conductor 3 extends from the two corresponding adjacent front latching portions 32 to be close to the rear end 31, each elastic piece 33 can occupy a certain length in an axial direction of the outer conductor 3. Therefore, each elastic piece 33 has a better elasticity and endures repeated inserting and pulling out and is not prone to deform, so that stability in transferring a current or a signal can be promoted, so as to avoid instantaneous interruption of power or interruption of signal occurring.

Referring to FIG. 1, FIG. 2 and FIG. 5, by that the outer flange 34 is clamped by the first conductive member 21 and the second conductive member 22, it can avoid a gap generating between the outer flange 34 and the first conductive member 21 or a gap generating between the outer flange 34 and the second conductive member 22. By that the stopping surface 215 tightly abuts against the mating end surface 115 when the plug connector 20 mates with the receptacle connector 10, it can avoid a gap generating between the stopping surface 215 and the mating end surface 115. By that each slit 35 of the outer conductor 3 extends from the two corresponding adjacent front latching portions 32 to be close to the rear end 31, each elastic piece 33 has better elasticity, endures repeated inserting and pulling out and is not prone to deform. By the structural design as above, it can avoid instantaneous interruption of power or interruption of signal of the electrical connection device 100 occurring under vibrating, so that the plug connector 20 can be applied in a circumstance which requires to apply a current and perform transferring, for example sound source equipment or automotive rearview mirror fatigue detection and so on.

By that the positions of the plurality of front latching portions 32 of the outer conductor 3 are the same as a position of the C-shaped latching ring of the existing micro-miniature coaxial connector, in a precondition that the receptacle connector 10 which conforms to MMCX specification is not required to change a structure thereof to match with the plug connector 20, the receptacle connector 10 is capable of providing mating for the plug connector 20. Therefore, it does not need to redesign the structure of the receptacle connector 10 to match w the plug connector 20, so that entire manufacturing cost of the electrical connection device 100 can be lowered.

It is noted that, the plug connector 20 of the first embodiment also may set the front latching portion 32, the elastic piece 33 and the slit 35 each as one in number as desired, so it is not limited to the number disclosed by the first embodiment. In a varied implementation of the receptacle connector 10 of the first embodiment, the inner annular surface 117 also may be removed, so that the rear inner conical surface 116 and the front inner conical surface 118 are directly connected with each other. In another varied implementation of the receptacle connector 10 of the first embodiment, the rear inner conical surface 116 also may be removed, so that the inner annular surface 117 is directly connected to the mating end surface 115.

Figure 6:
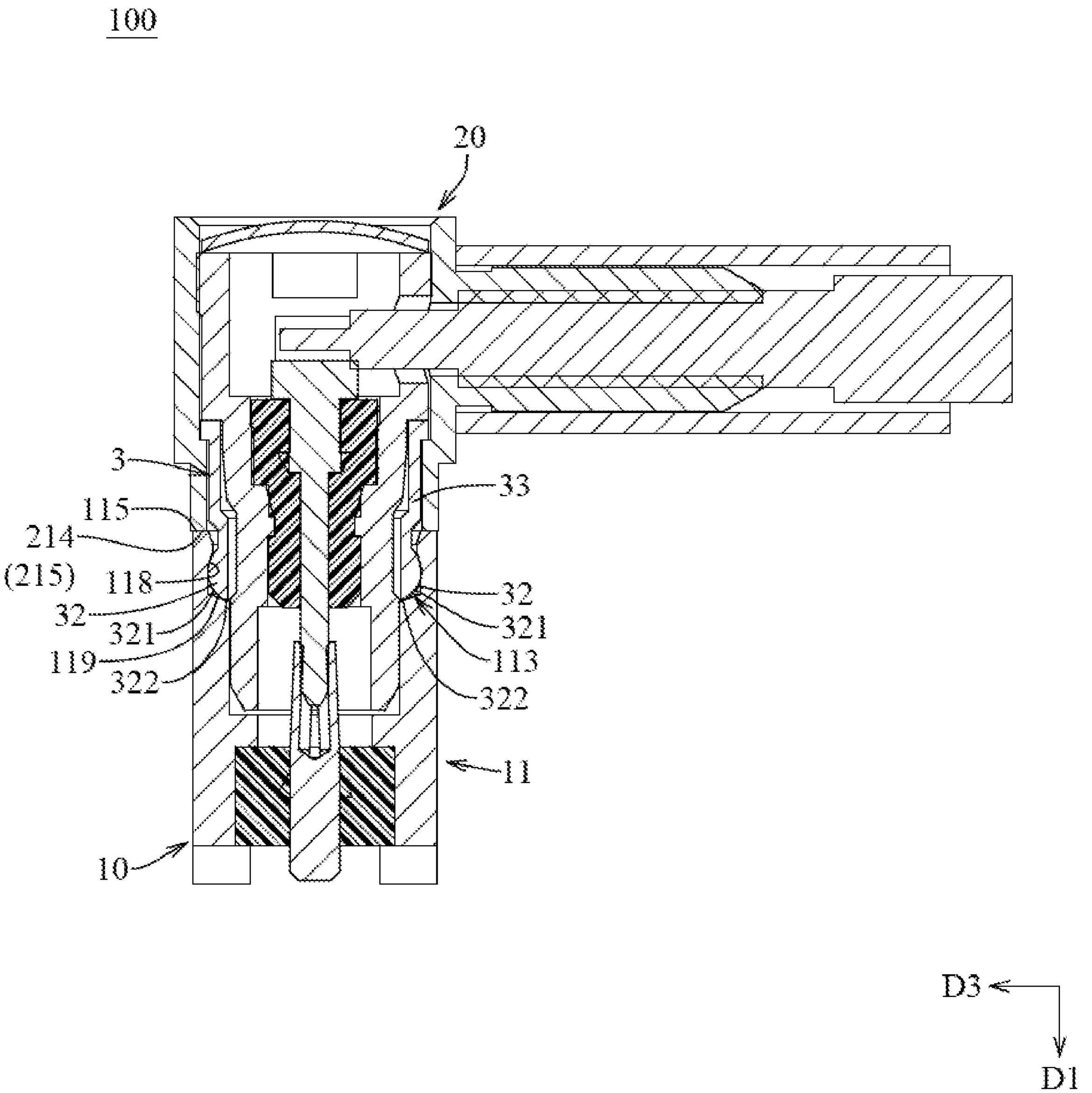
FIG. 6 is a cross sectional view of a second embodiment of the electrical connection device of the present disclosure.

Referring to FIG. 6, a second embodiment of the electrical connection device 100 of the present disclosure is substantially the same as the first embodiment in entire structure, a difference therebetween lies in the plug connector 20.

The outer shell 11 of the receptacle connector 10 further has a front stopping surface 119 which is positioned in front of the front inner conical surface 118, is spaced apart from the front inner conical surface 118, and surrounds the inner annular groove 113. Each front latching portion 32 of the outer conductor 3 further has a front abutting surface 322 which is connected to a front end of the arc surface 321, the front abutting surface 322 is used to abut against the front stopping surface 119. When the plug connector 20 mates with the receptacle connector 10, the stopping surface 215 and the front abutting surface 322 tightly abut against the mating end surface 115 and the front stopping surface 119 respectively. Therefore, firmness that the plug connector 20 mates with the receptacle connector 10 can be further promoted.

Figure 7:
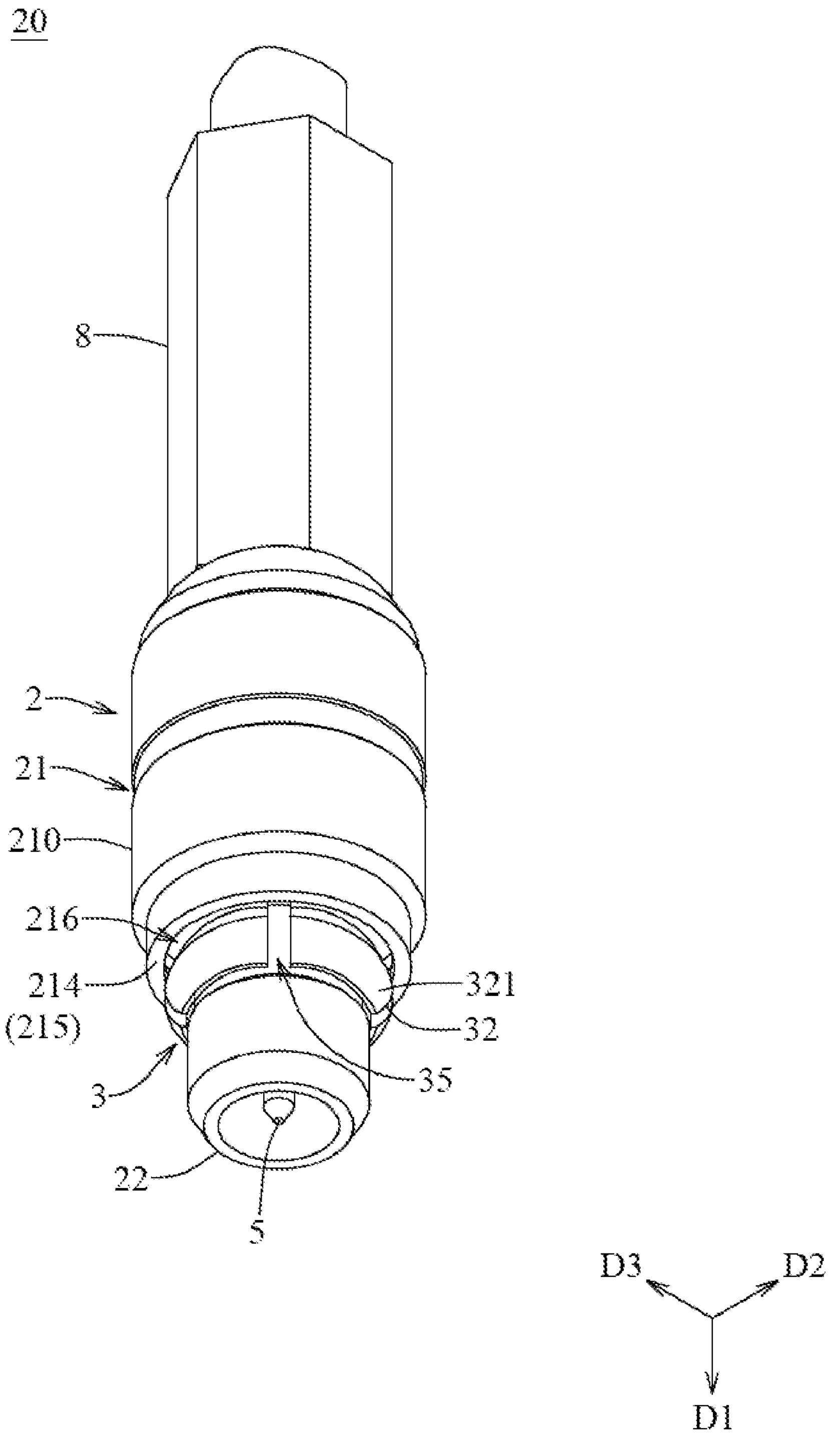
FIG. 7 is a perspective view of a plug connector of a third embodiment of the electrical connection device of the present disclosure.
Figure 8:
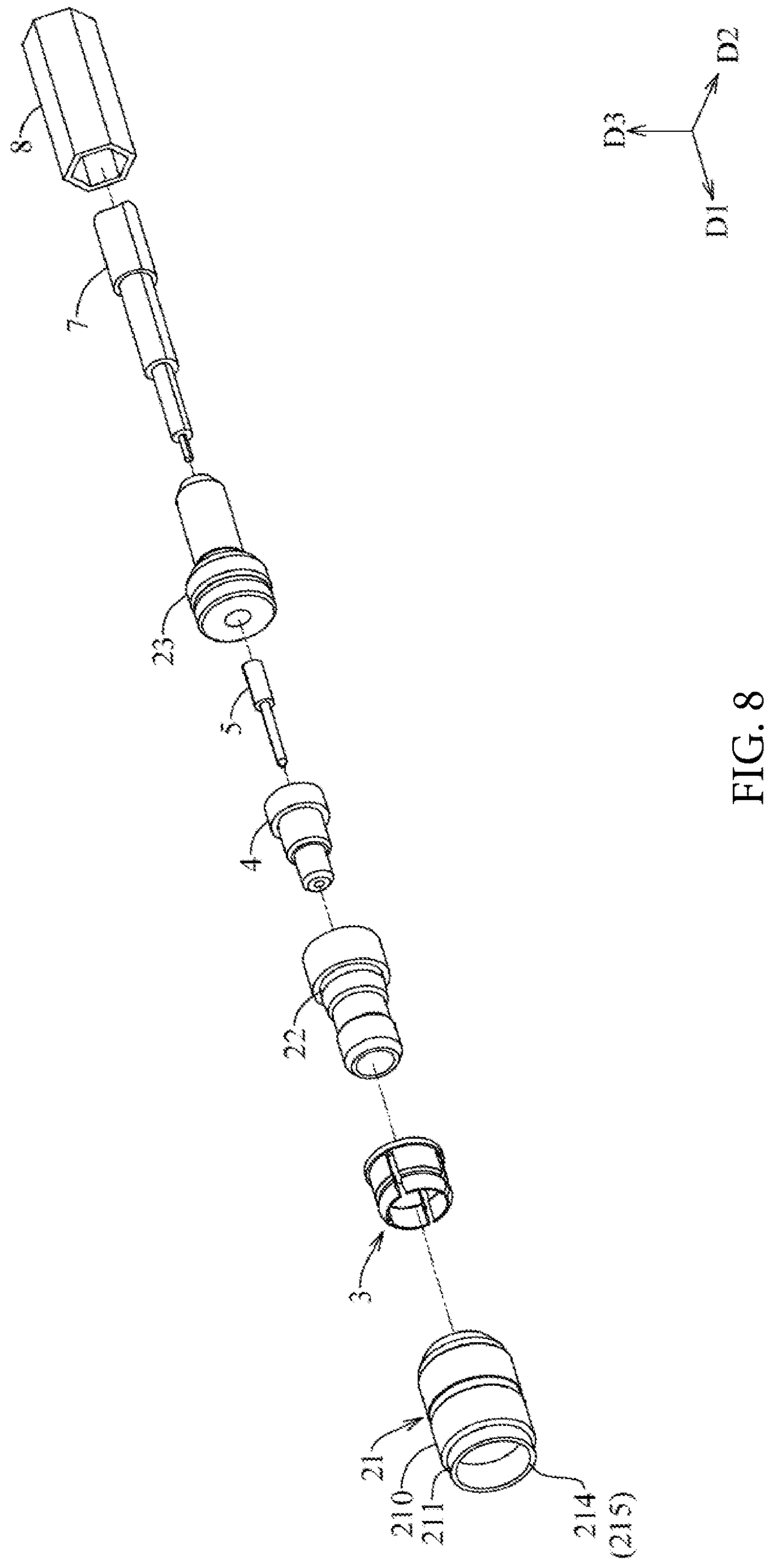
FIG. 8 is a perspective exploded view of the plug connector of the third embodiment.
Figure 9:
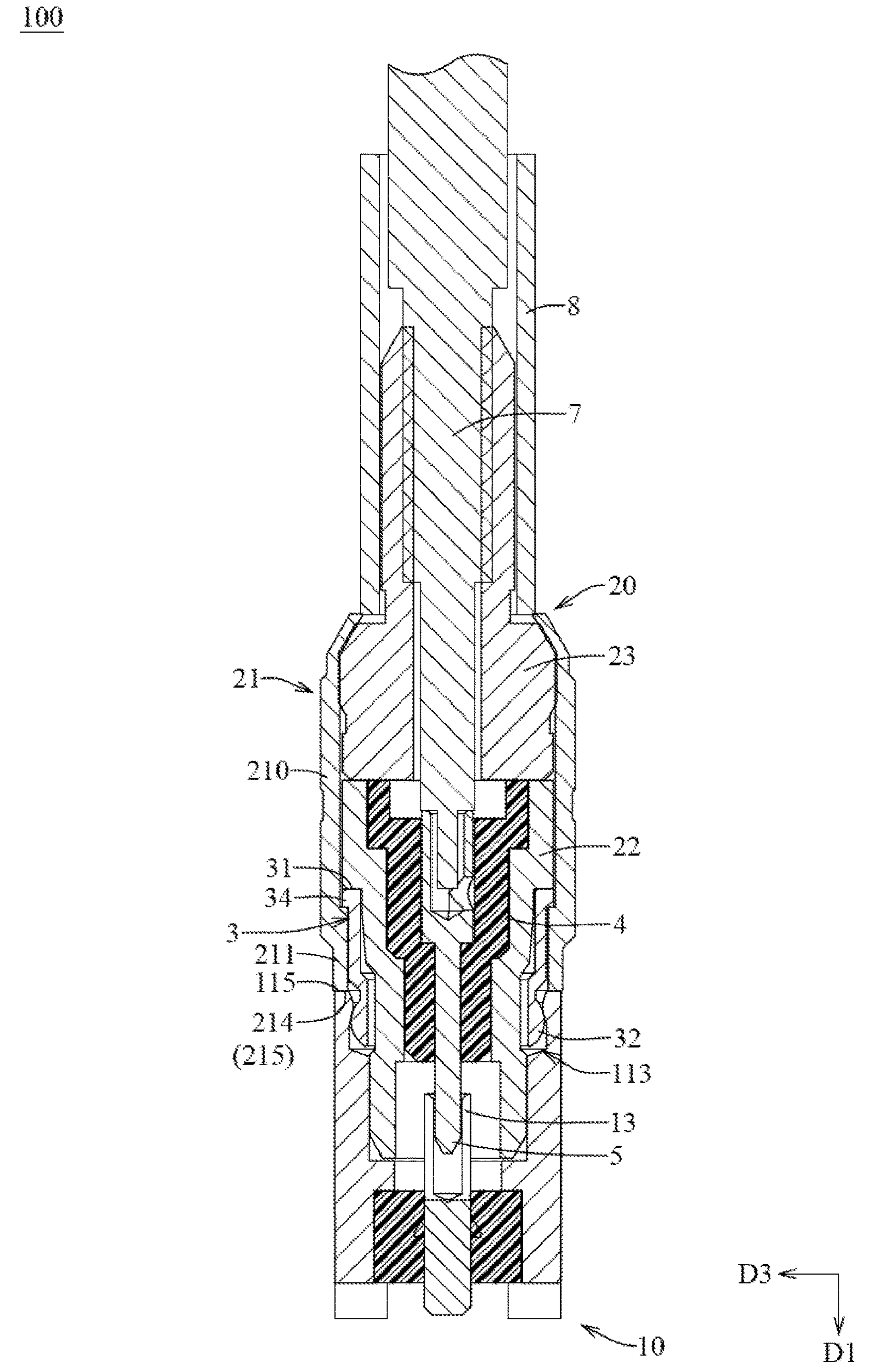
FIG. 9 is a cross sectional view of the third embodiment.

Referring to FIG. 7, FIG. 8 and FIG. 9, a third embodiment of the electrical connection device 100 of the present disclosure is substantially the same as the first embodiment in entire structure, a difference therebetween lies in the plug connector 20.

The plug connector 20 is a straight connector. The outer casing 210 of the first conductive member 21 of the conductive body 2 is in form of sleeve shape, the rear end of the outer casing 210 is in form of opened shape. The annular surrounding wall 211 extends forwardly from the front end of the outer casing 210. The conductive body 2 further has a third conductive member 23 which is in form of hollow cylinder shape. The third conductive member 23 is provided in the outer casing 210 of the first conductive member 21, is positioned behind the second conductive member 22, and partially protrudes from the rear end of the outer casing 210. The cable 7 is provided in the third conductive member 23 and the insulative body 4 and is electrically connected to the central terminal 5. The bushing 8 sheathes the third conductive member 23. The third embodiment provides another different style of the plug connector 20, the plug connector 20 similarly has an effect the same as that of the plug connector 20 of the first embodiment.

Figure 10:
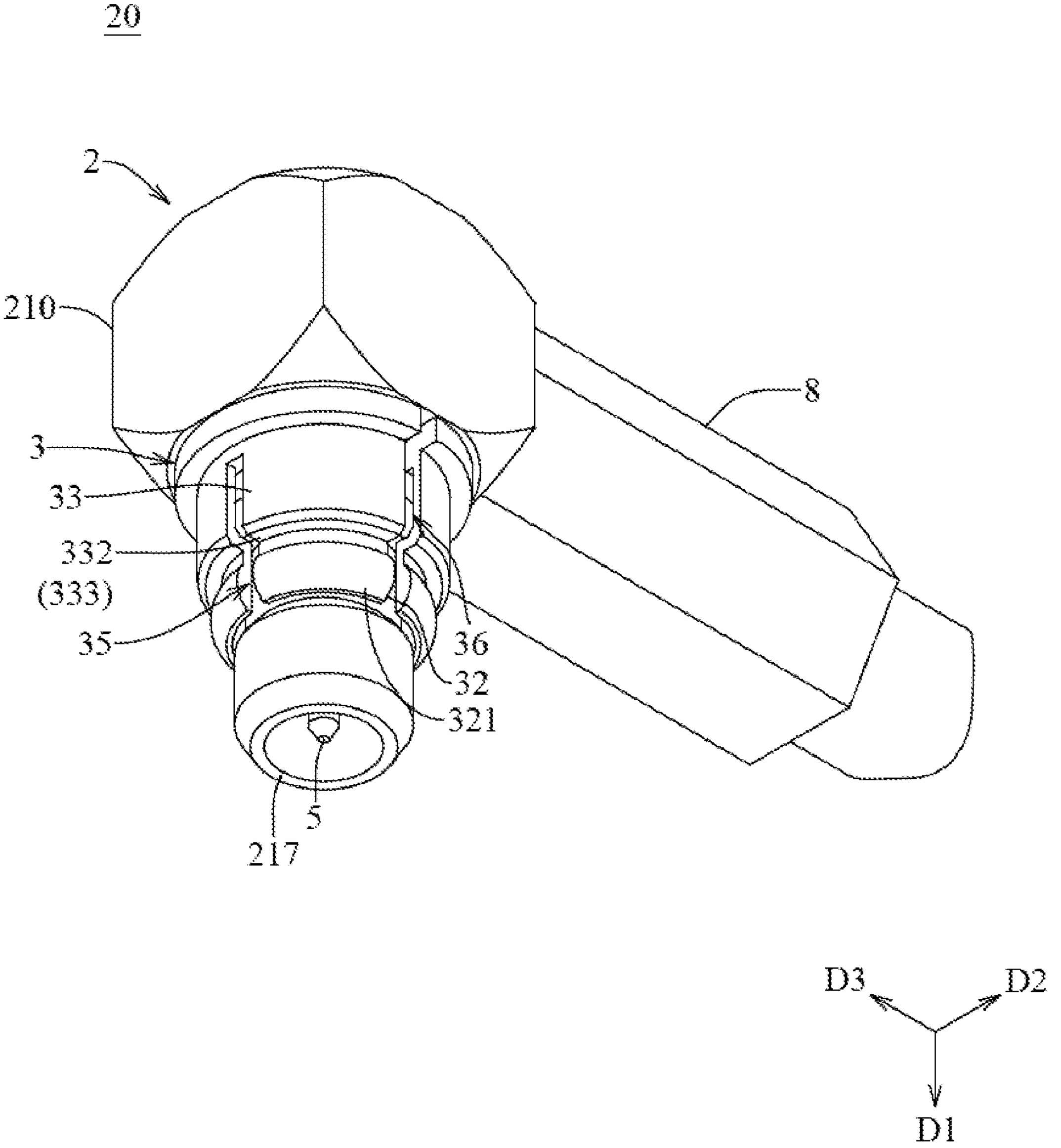
FIG. 10 is a perspective view of a plug connector of a fourth embodiment of the electrical connection device of the present disclosure.
Figure 11:
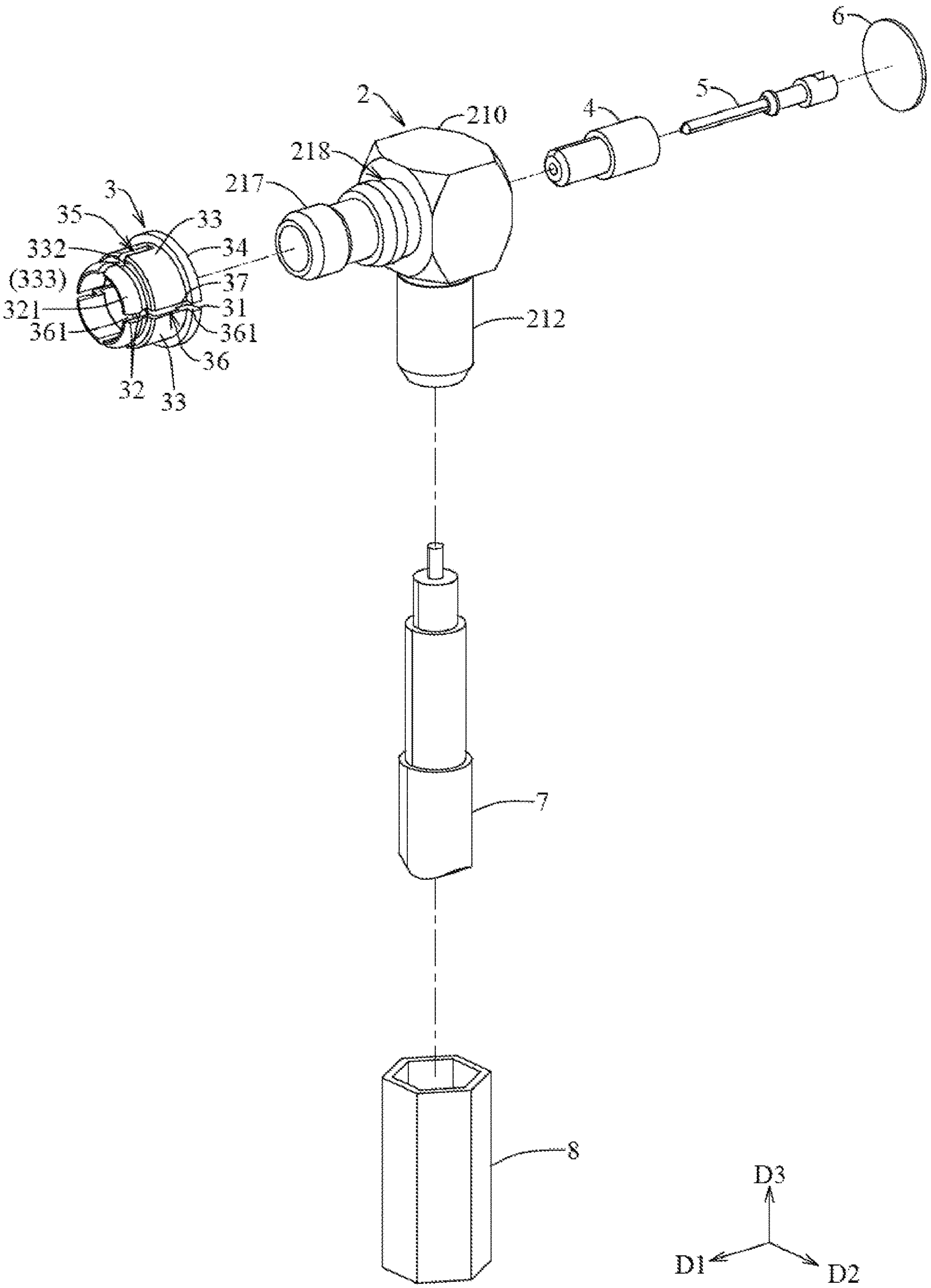
FIG. 11 is a perspective exploded view of the plug connector of the fourth embodiment.
Figure 12:
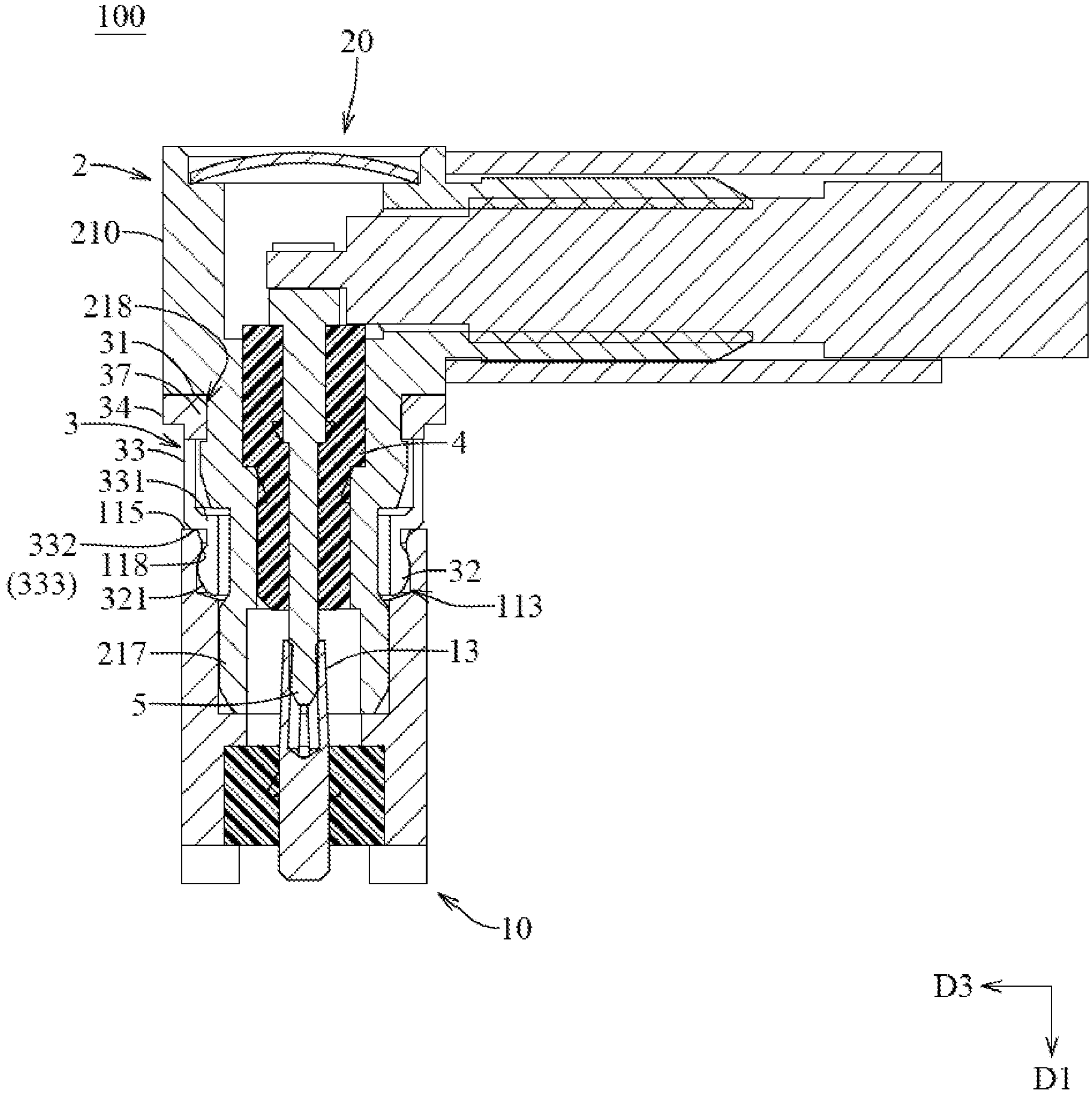
FIG. 12 is a cross sectional view of the fourth embodiment.

Referring to FIG. 10, FIG. 11 and FIG. 12, a fourth embodiment of the electrical connection device 100 of the present disclosure is substantially the same as the first embodiment in entire structure, a difference therebetween lies in the plug connector 20.

The conductive body 2 is a single-piece component which is similar to the first conductive member 21 of the first embodiment in structure. The conductive body 2 has the outer casing 210, the guiding post 212 and an annular circumferential wall 217. The annular circumferential wall 217 extends forwardly from the front end of the outer casing 210. The annular circumferential wall 217 is recessed radially to form an annular recessed groove 218 which is opened outwardly and is adjacent to the outer casing 210.

The outer conductor 3 sheathes the annular circumferential wall 217 of the conductive body 2 and is formed with a penetrating gap 36. The penetrating gap 36 extends from the two corresponding adjacent front latching portions 32 to the rear end 31. The penetrating gap 36 has two through opening portions 361, the two through opening portions 361 are respectively positioned between the two corresponding adjacent front latching portions 32 and at the rear end 31. Therefore, a cross section of the outer conductor 3 taken along a direction perpendicular to an axial direction of the outer conductor 3 is in form of C-shape, so that the outer conductor 3 has a tightening elastic force which can tighten the annular circumferential wall 217. The outer conductor 3 further has an inner flange 37 which is connected to the rear end 31. The inner flange 37 snaps to the annular recessed groove 218, the inner flange 37 applies an elastic force to clamp the annular circumferential wall 217 of the conductive body 2 by means of the tightening elastic force.

Each elastic piece 33 of the outer conductor 3 has a shoulder 331. The shoulder 331 has a shoulder surface 332 which is toward the front, the shoulder surface 332 is formed to be used to abut against a stopping surface 333 of the mating end surface 115. Therefore, each elastic piece 33 is formed with the stopping surface 333. When the plug connector 20 mates with the receptacle connector 10, the stopping surface 333 tightly abuts against the mating end surface 115.

By that the inner flange 37 applies an elastic force to clamp the annular circumferential wall 217, a contact state between the inner flange 37 and the annular circumferential wall 217 is held, it can prevent the outer conductor 3 from arbitrarily shaking relative to the annular circumferential wall 217 in a two dimensional plane constituted by the second direction D2 and the third direction D3. By that the inner flange 37 snaps to the annular recessed groove 218, it can prevent the outer conductor 3 from arbitrarily moving relative to the annular circumferential wall 217 along the first direction D1. Therefore, it can avoid the outer conductor 3 and the annular circumferential wall 217 generating a gap therebetween, stability of transferring of a current or a signal over the outer conductor 3 and the conductive body 2 can be assured, occurring of instantaneous interruption of power or interruption of signal also can be avoided.

By that the conductive body 2 is a single-piece component, the number of constituting components of the plug connector 20 can be reduced. Therefore, assembling convenience between the conductive body 2 and the other constituting components can be promoted, the structure of the plug connector 20 is simple after the plug connector 20 is assembled, and manufacturing cost of the plug connector 20 can be further lowered.

Figure 13:
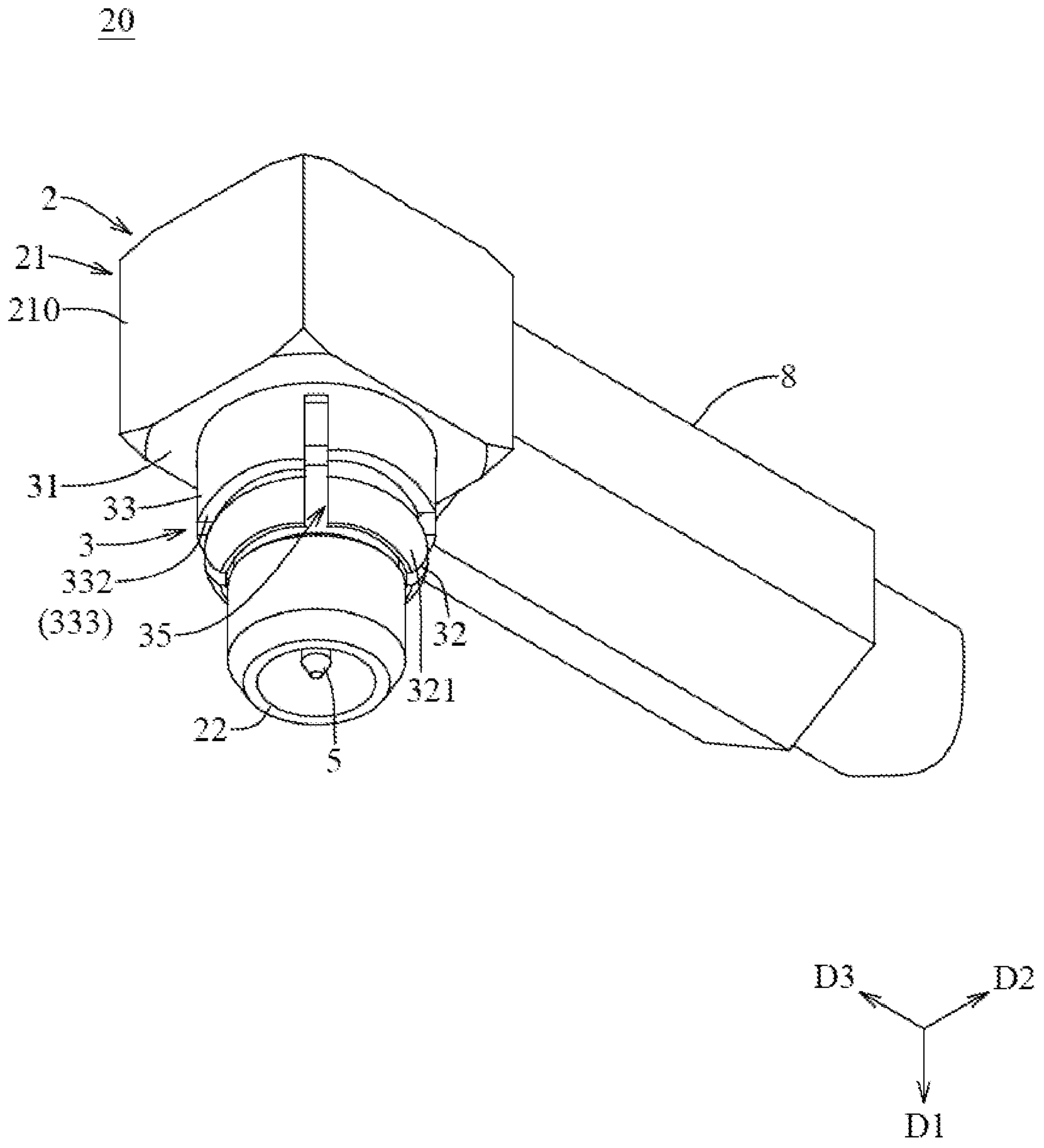
FIG. 13 is a perspective view of a plug connector of a fifth embodiment of the electrical connection device of the present disclosure.
Figure 14:
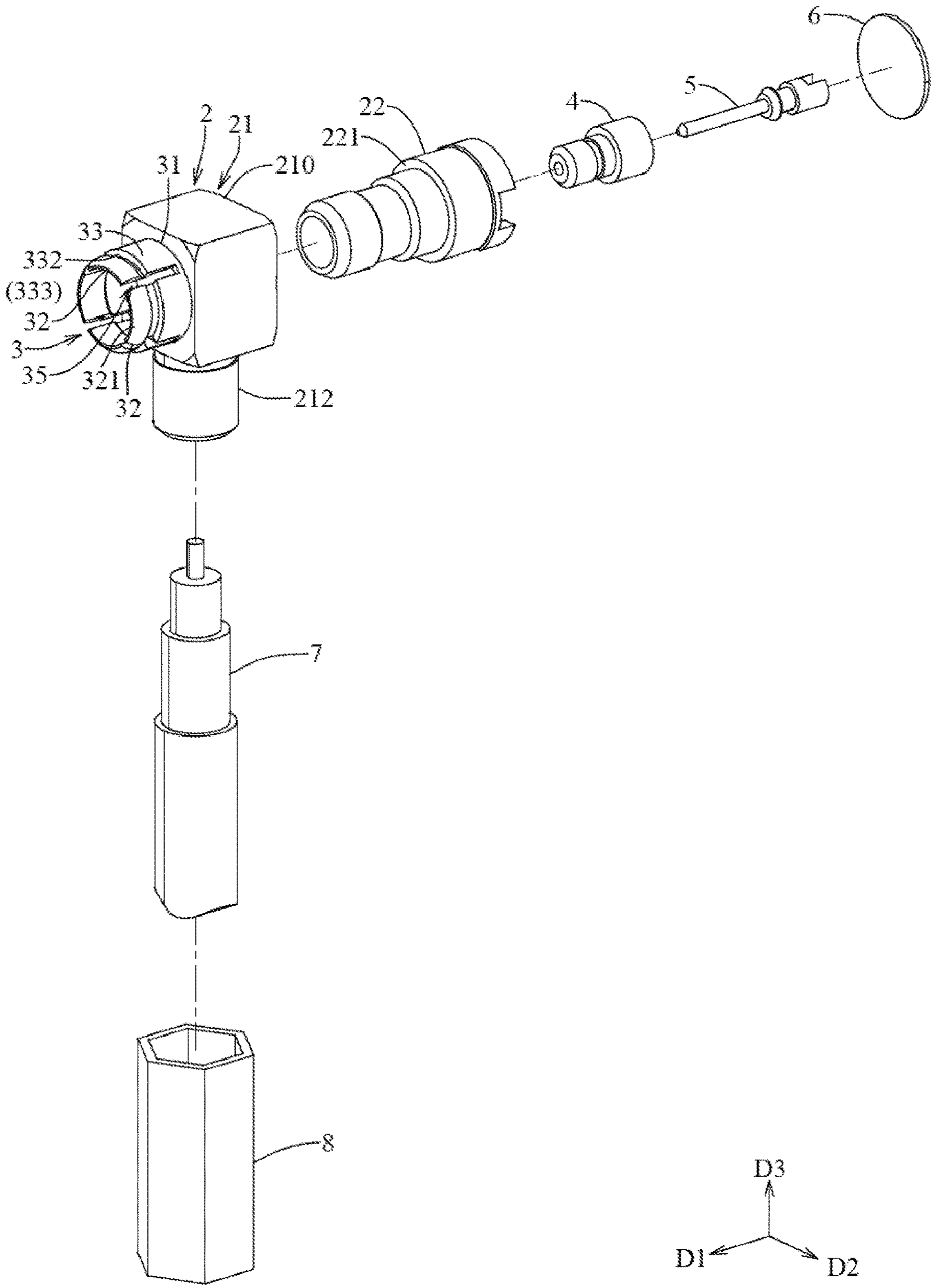
FIG. 14 is a perspective exploded view of the plug connector of the fifth embodiment.
Figure 15:
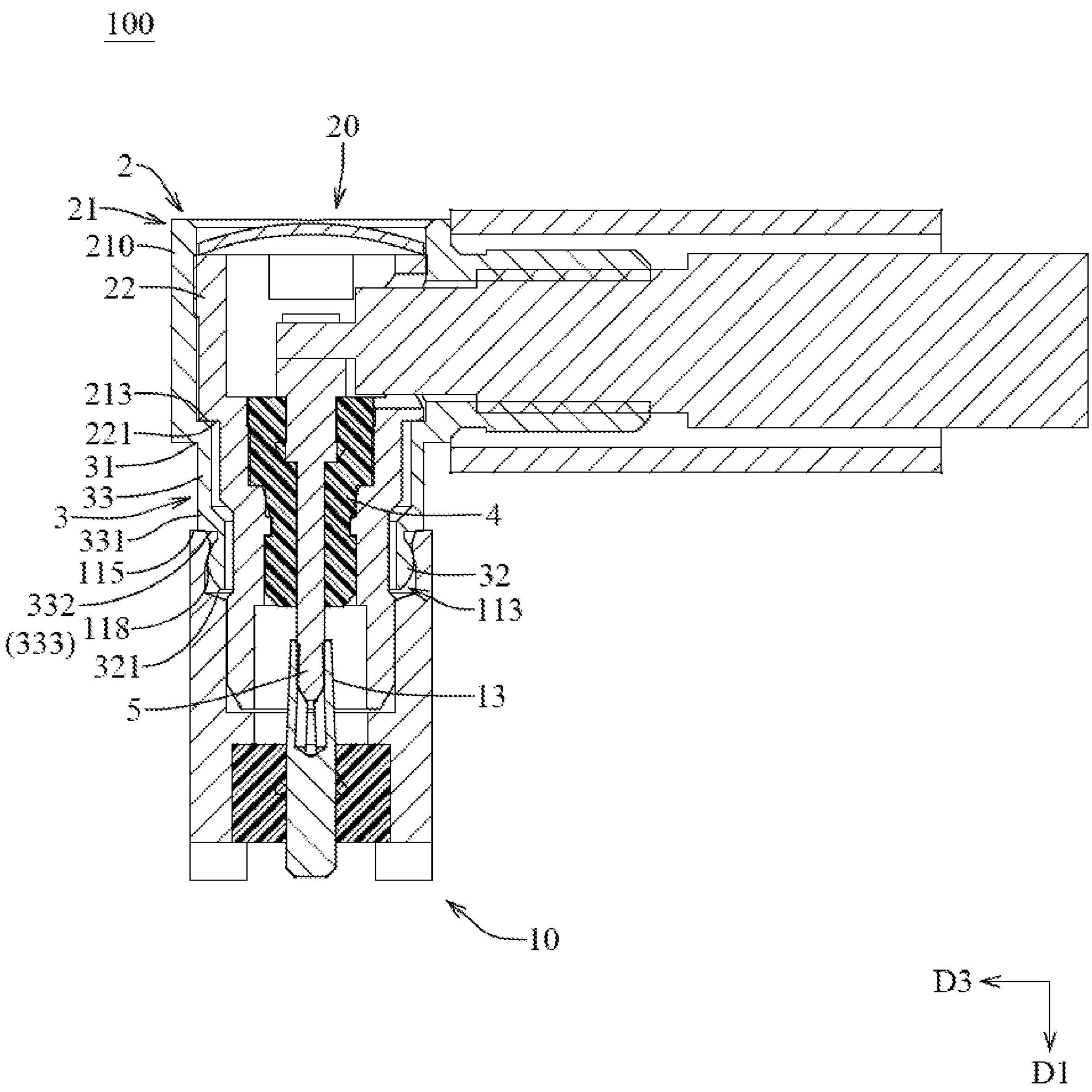
FIG. 15 is a cross sectional view of the fifth embodiment.

Referring to FIG. 13, FIG. 14 and FIG. 15, a fifth embodiment of the electrical connection device 100 of the present disclosure is substantially the same as the first and fourth embodiments in entire structure, a difference therebetween lies in the plug connector 20.

The rear end 31 of the outer conductor 3 is integrally connected to the front end of the outer casing 210 of the first conductive member 21, the outer conductor 3 and the first conductive member 21 are integrally formed and together constitute a single-piece component. By that the rear end 31 is integrally connected to the front end of the outer casing 210, the outer conductor 3 and the first conductive member 21 do not generate a gap therebetween. Each elastic piece 33 of the outer conductor 3 is similar to the fourth embodiment in structure, each elastic piece 33 similarly has the shoulder 331, the shoulder 331 has the shoulder surface 332, the shoulder surface 332 is formed to be used to abut against the stopping surface 333 of the mating end surface 115. The second conductive member 22 is provided in the outer casing 210 of the first conductive member 21 and the outer conductor 3 and partially protrudes from front ends of the plurality of front latching portions 32, the annular surface 221 of the second conductive member 22 abuts against the rear stopping surface 213 of the first conductive member 21.

By that the outer conductor 3 and the first conductive member 21 are integrally formed and together constitute a single-piece component, the number of the constituting components of the plug connector 20 can be reduced. Therefore, assembling convenience between the conductive body 2 and the other constituting components can be promoted, the structure of the plug connector 20 is simple after the plug connector 20 is assembled, and manufacturing cost of the plug connector 20 can be further lowered.

Figure 16:
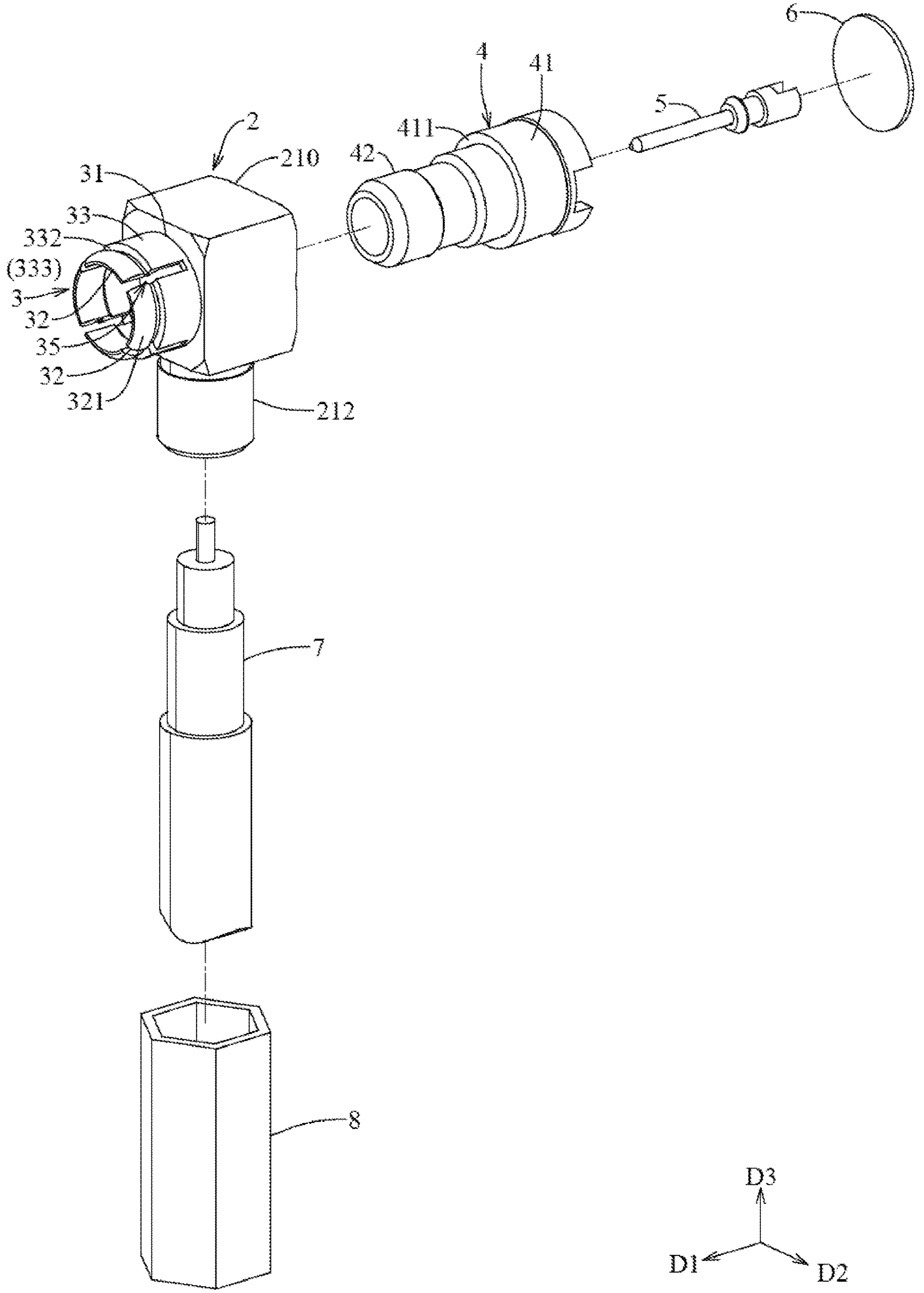
FIG. 16 is a perspective exploded view of a plug connector of a sixth embodiment of the electrical connection device of the present disclosure.
Figure 17:
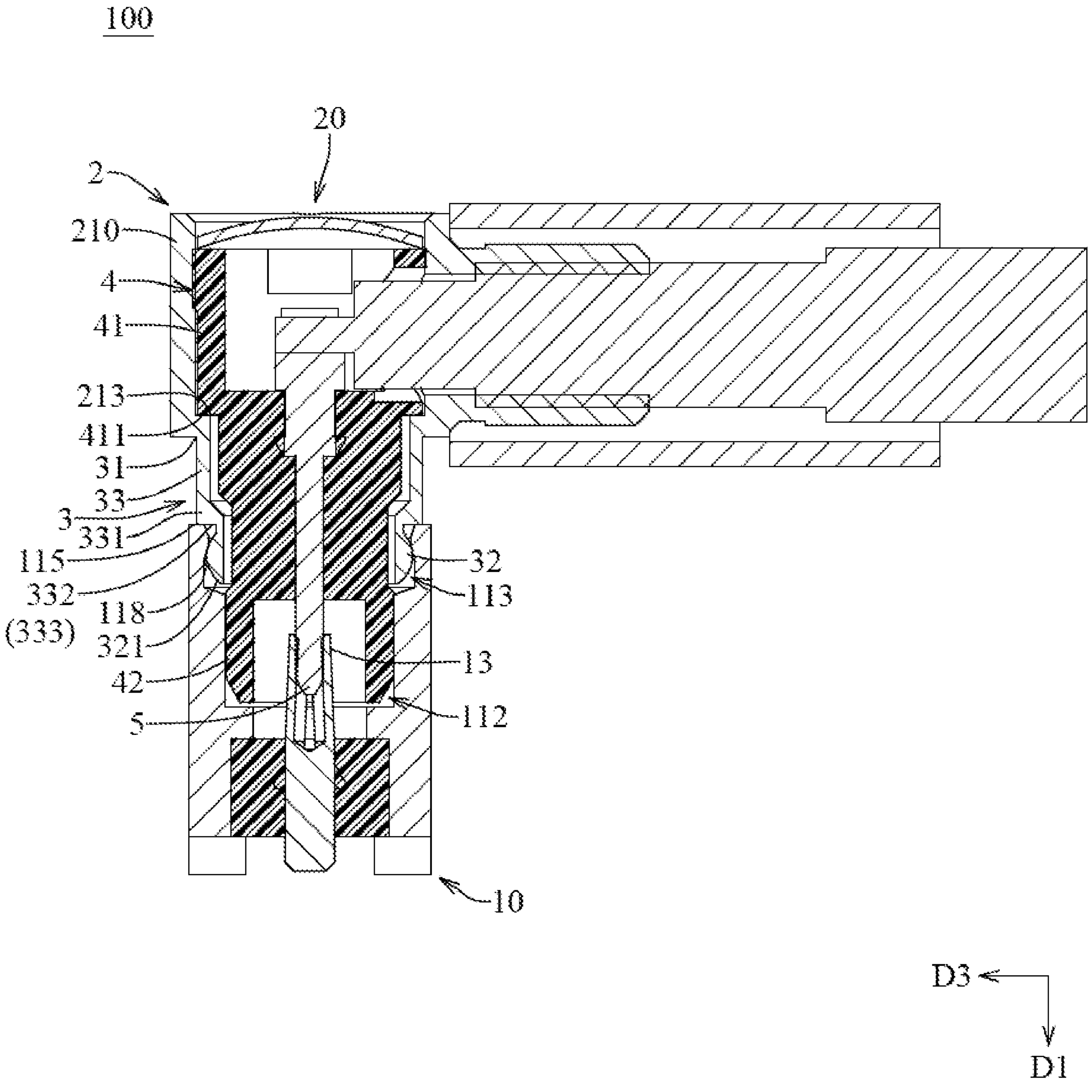
FIG. 17 is a cross sectional view of the sixth embodiment.

Referring to FIG. 16 and FIG. 17, a sixth embodiment of the electrical connection device 100 of the present disclosure is substantially the same as the fifth embodiment in entire structure, a difference therebetween lies in the plug connector 20.

The conductive body 2 is a single-piece component and is the same as the first conductive member 21 of the fifth embodiment in structure. The rear end 31 of the outer conductor 3 is integrally connected to the front end of the outer casing 210 of the conductive body 2, the outer conductor 3 and the conductive body 2 are integrally formed and together constitute a single-piece component. The insulative body 4 is the same as the second conductive member 22 of the fifth embodiment in structure. The insulative body 4 has a providing segment 41 and a head segment 42 which is formed to a front end of the providing segment 41. The providing segment 41 of the insulative body 4 is provided in the outer casing 210 of the conductive body 2 and the outer conductor 3. The head segment 42 protrudes from the front ends of the plurality of front latching portions 32, and is used to insert into the insertion groove 112. The providing segment 41 has an annular surface 411 which abuts against the rear stopping surface 213 of the conductive body 2. By that the head segment 42 surrounds an outer periphery of the central terminal 5, it can avoid the female terminal 13 of the receptacle connector 10 contacting a conductor except the central terminal 5 to cause a short circuit when a user obliquely improperly inserts or pulls out the plug connector 20.

By that the conductive body 2 is a single-piece component and the outer conductor 3 and the conductive body 2 are integrally formed and together constitute a single-piece component, the number of the constituting components of the plug connector 20 can be further reduced. Therefore, assembling convenience between the conductive body 2 and the other constituting components can be promoted, the structure of the plug connector 20 is simple after the plug connector 20 is assembled, and manufacturing cost of the plug connector 20 can be further lowered.

Figure 18:
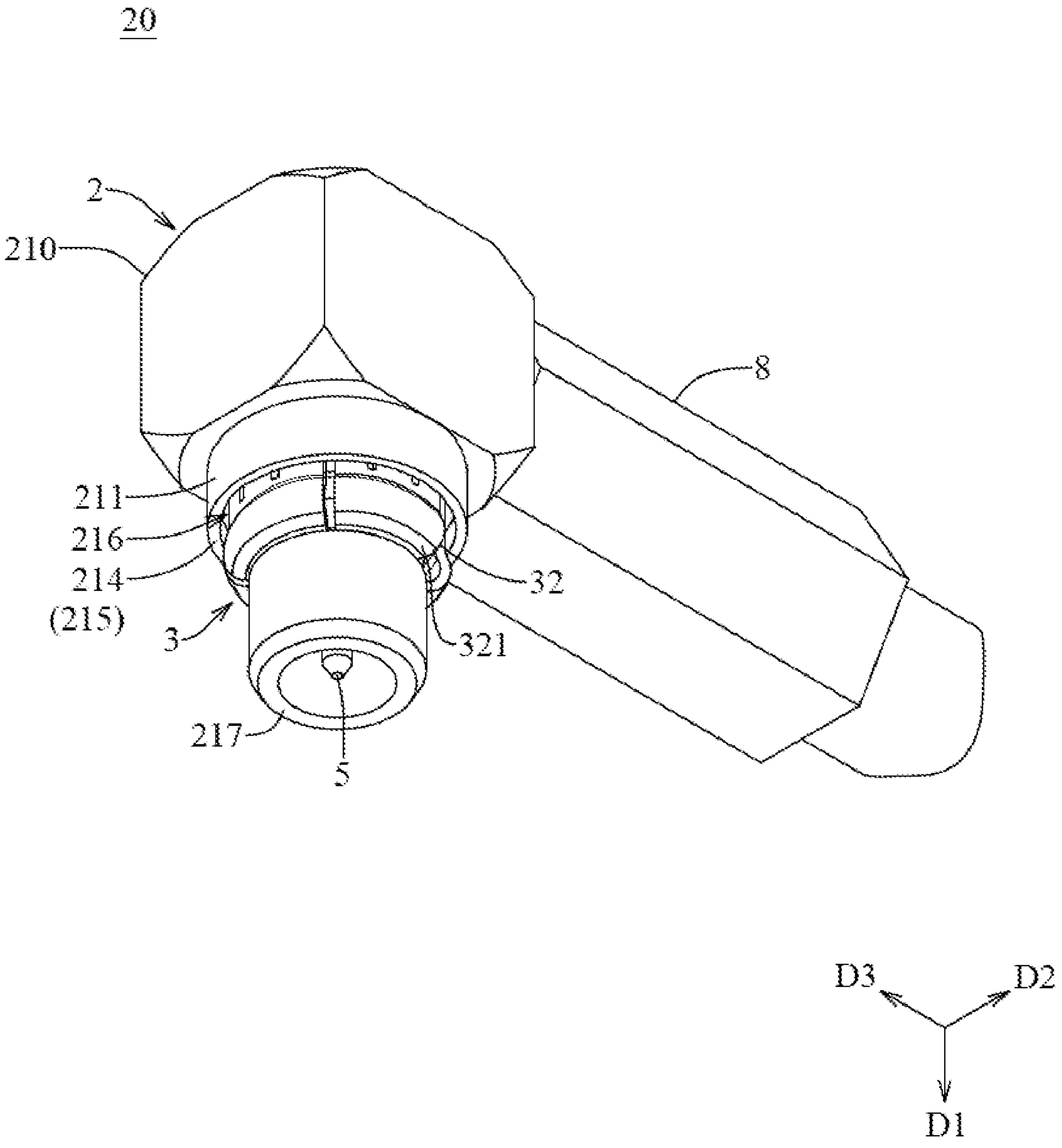
FIG. 18 is a perspective view of a plug connector of a seventh embodiment of the electrical connection device of the present disclosure.
Figure 19:
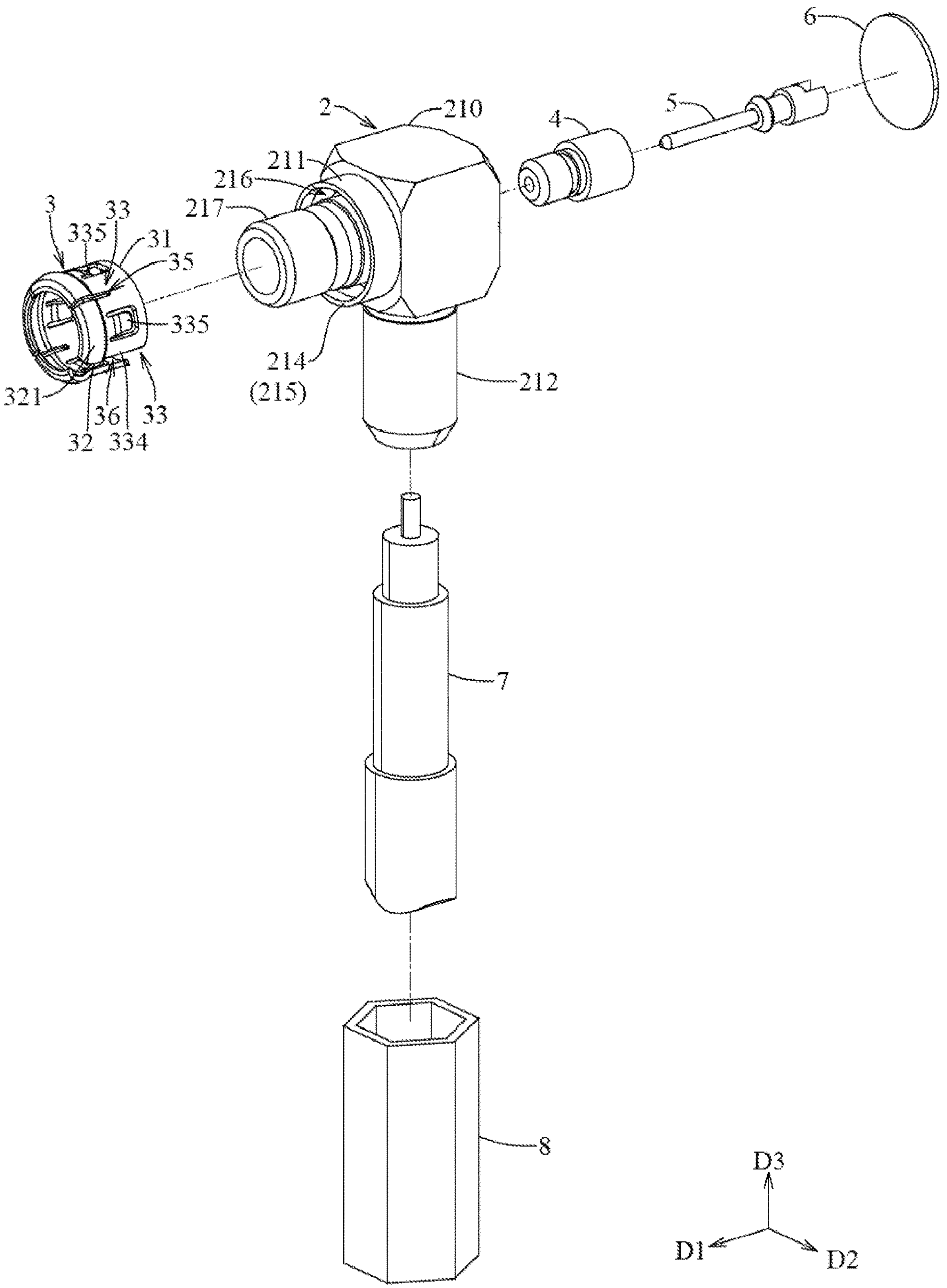
FIG. 19 is a perspective exploded view of the plug connector of the seventh embodiment.
Figure 20:
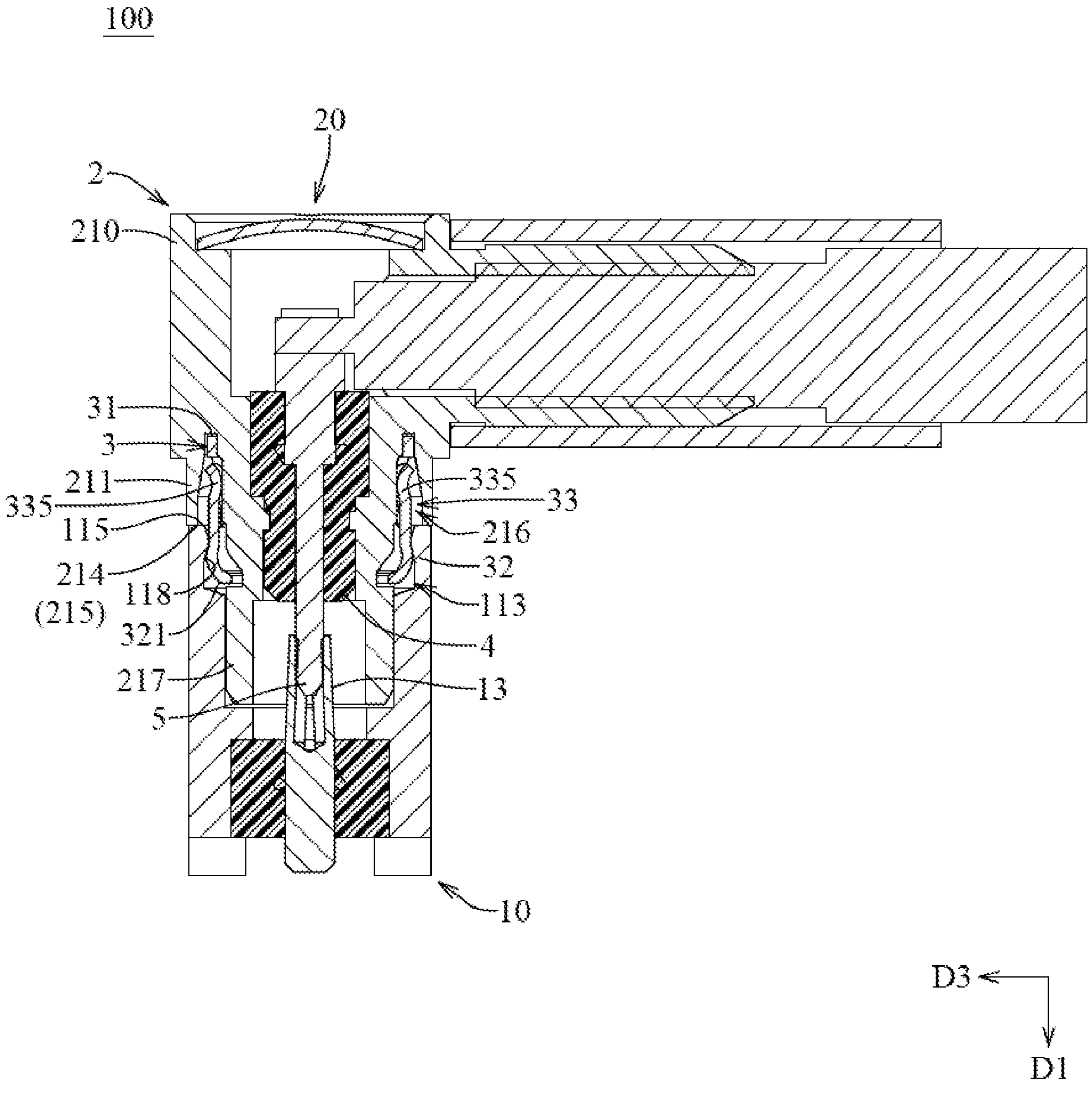
FIG. 20 is a cross sectional view of the seventh embodiment.

Referring to FIG. 18, FIG. 19 and FIG. 20, a seventh embodiment of the electrical connection device 100 of the present disclosure is substantially the same as the first and fourth embodiments in entire structure, a difference therebetween lies in the plug connector 20.

The conductive body 2 is a single-piece component and is similar to the conductive body 2 of the fourth embodiment in structure. The conductive body 2 has the outer casing 210, the annular surrounding wall 211, the guiding post 212 and the annular circumferential wall 217. The annular surrounding wall 211 surrounds the annular circumferential wall 217. The annular circumferential wall 217 partially protrudes from the front end surface 214 of the annular surrounding wall 211. The outer casing 210, the annular surrounding wall 211 and the annular circumferential wall 217 together define the annular channel 216.

The outer conductor 3 is similar to the outer conductor 3 of the fourth embodiment in structure. The outer conductor 3 sheathes the annular circumferential wall 217 of the conductive body 2. The rear end 31 and the plurality of elastic pieces 33 of the outer conductor 3 are received in the annular channel 216, the plurality of front latching portions 32 are exposed from the annular channel 216. A location of the outer conductor 3 adjacent to the rear end 31 clamps the annular circumferential wall 217 of the conductive body 2 by applying an elastic force by means of the tightening elastic force. Each elastic piece 33 has a first elastic piece body 334 which is connected to the corresponding front latching portion 32 and a second elastic piece body 335 which extends rearwardly from the first elastic piece body 334. The second elastic piece body 335 is used to apply an elastic force to abut against the annular circumferential wall 217 of the conductive body 2. The plurality of elastic pieces 33 clamp the annular circumferential wall 217 by that the plurality of second elastic piece body 335 each apply the elastic force. Therefore, a contact state between the outer conductor 3 and the annular circumferential wall 217 is held, it can prevent the outer conductor 3 from arbitrarily shaking relative to the annular circumferential wall 217 in a two dimensional plane constituted by the second direction D2 and the third direction D3, it can further prevent the outer conductor 3 from arbitrarily moving relative to the annular circumferential wall 217 along the first direction D1. Accordingly, it can avoid the outer conductor 3 and the annular circumferential wall 217 generating a gap therebetween, stability of transferring of a current or a signal over the outer conductor 3 and the conductive body 2 can be assured, occurring of instantaneous interruption of power or interruption of signal also can be avoided.

By that only the plurality of front latching portions 32 of the outer conductor 3 are exposed from the annular channel 216 and all the remaining locations of the outer conductor 3 are received in the annular channel 216, the annular circumferential wall 217 and the annular surrounding wall 211 of the conductive body 2 can function to protect the plurality of elastic pieces 33 respectively from an inner side of the plurality of elastic pieces 33 and an outer side of the plurality of elastic pieces 33. Therefore, it can prevent the plurality of elastic pieces 33 from being damaged due to human factor influence.

Figure 21:
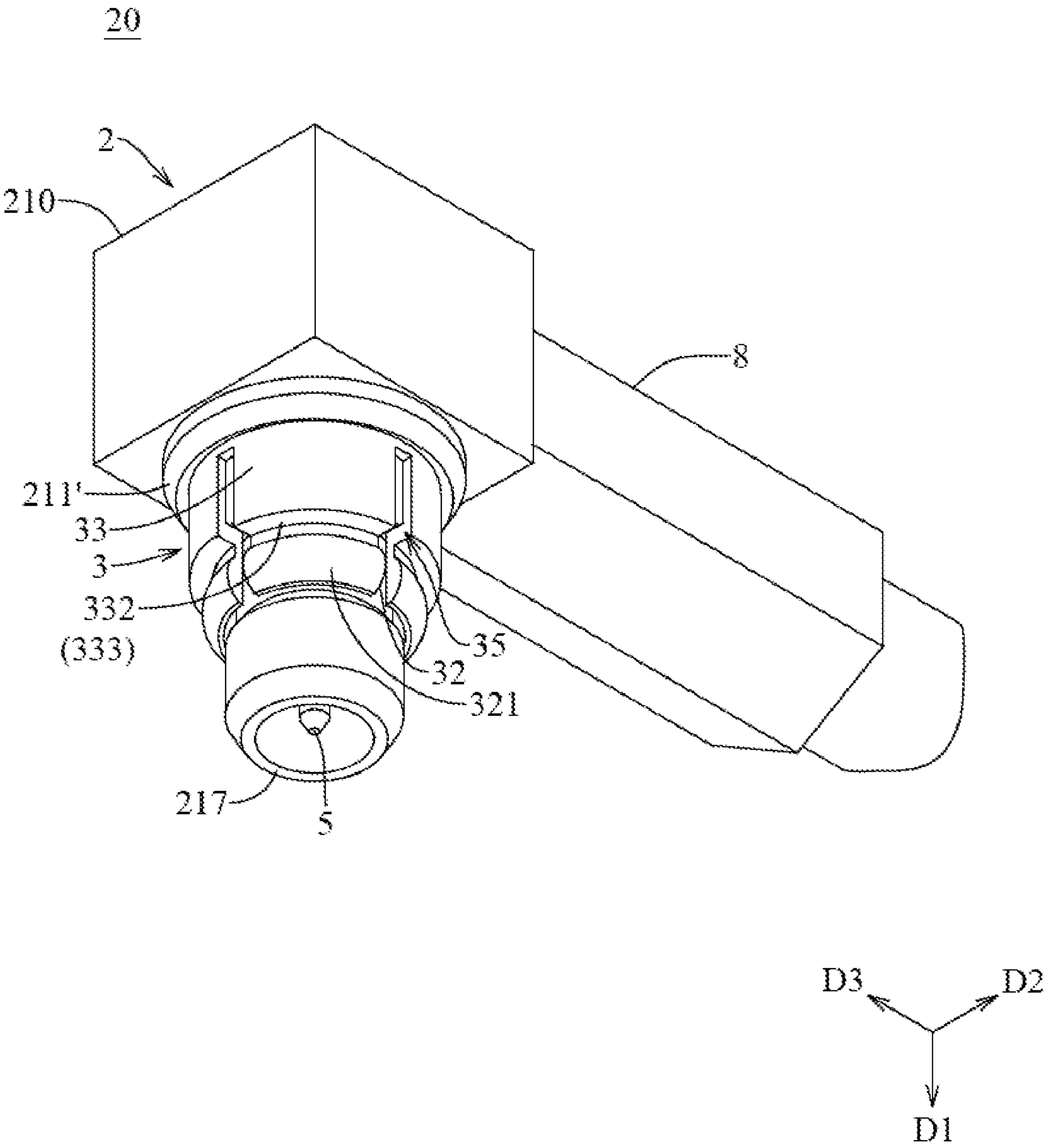
FIG. 21 is a perspective view of a plug connector of an eighth embodiment of the electrical connection device of the present disclosure.
Figure 22:
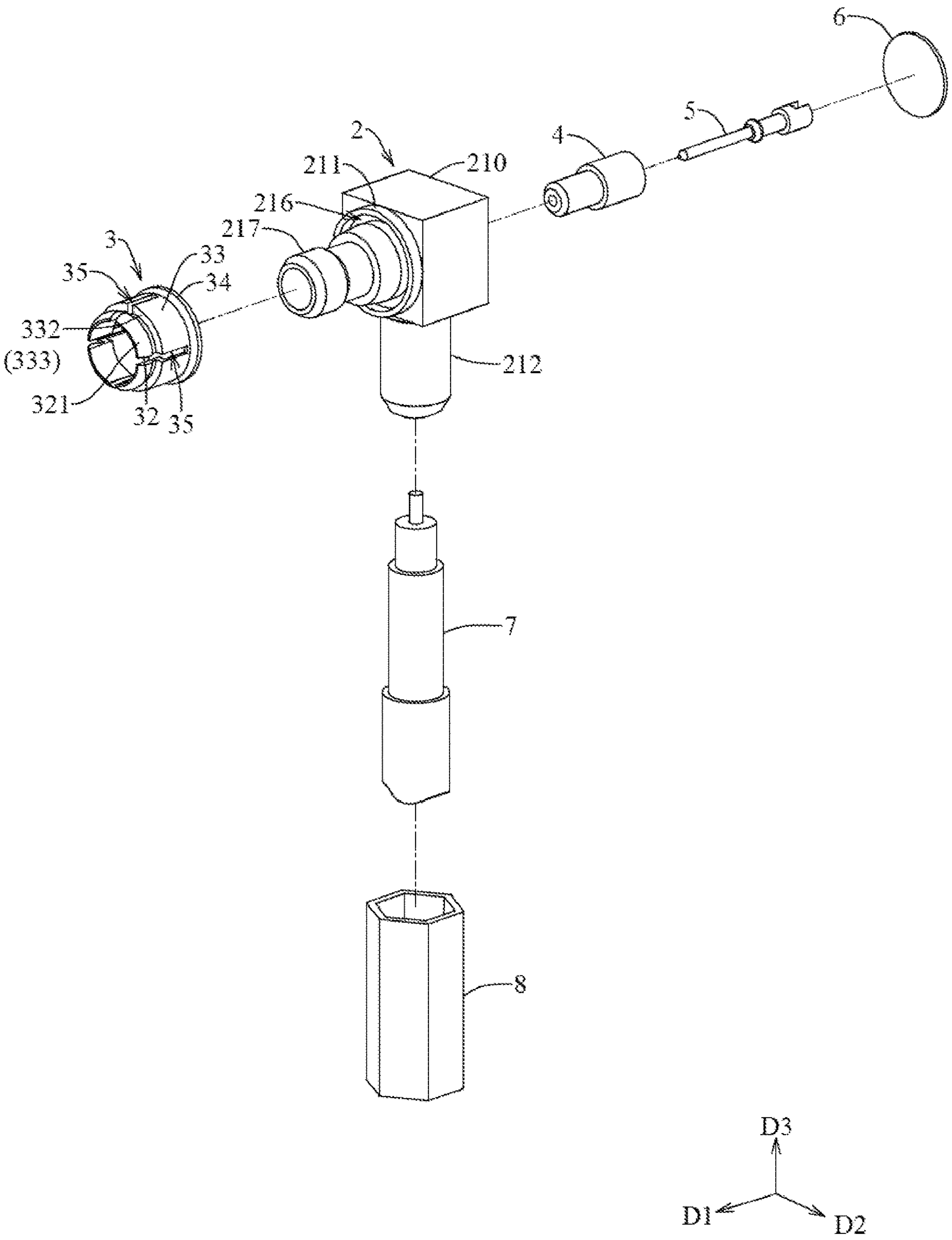
FIG. 22 is a perspective exploded view of the plug connector of the eighth embodiment.
Figure 23:
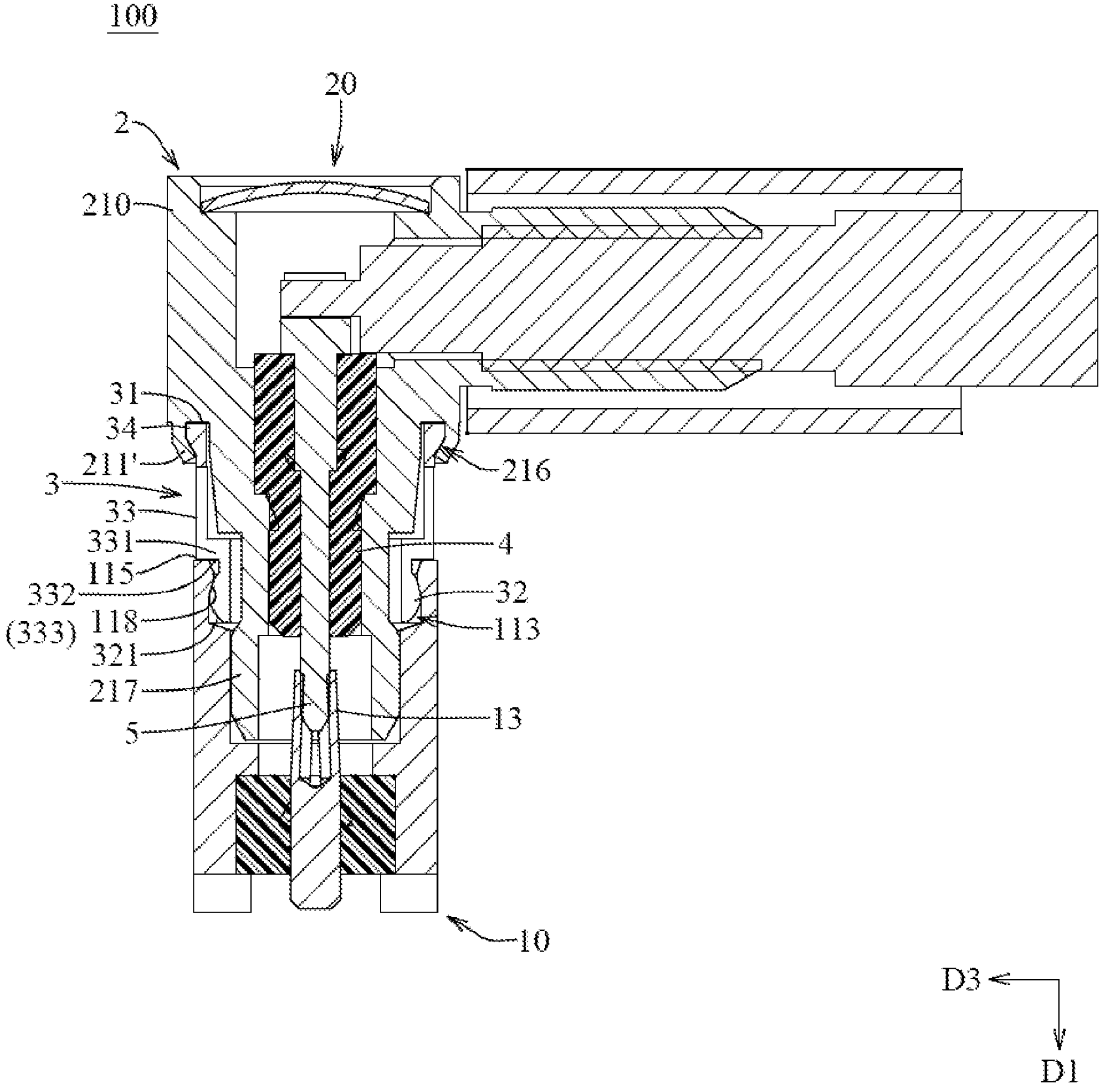
FIG. 23 is a cross sectional view of the eighth embodiment.

Referring to FIG. 21, FIG. 22 and FIG. 23, an eighth embodiment of the electrical connection device 100 of the present disclosure is substantially the same as the first, fourth and seventh embodiments in entire structure, a difference therebetween lies in the plug connector 20.

The conductive body 2 is a single-piece component and is similar to the conductive body 2 of the seventh embodiment in structure. The outer conductor 3 is similar to the outer conductor 3 of the fourth embodiment in structure, a difference therebetween lies in that the outer conductor 3 of the eighth embodiment does not have the penetrating gap 36 and the inner flange 37. When the outer conductor 3 is assembled to the conductive body 2, firstly the outer conductor 3 sheathes the annular circumferential wall 217 of the conductive body 2, so that the rear end 31 and the outer flange 34 are received in the annular channel 216. Subsequently, a processing operation, such as rolling riveting, is performed on the annular surrounding wall 211, so that the annular surrounding wall 211 forms an annular latch pressuring wall 211'. A front end of the annular latch pressuring wall 211' is deformed to bend inwardly and latch and press against the outer flange 34, so, it can prevent the outer flange 34 from detaching from the annular channel 216, the rear end 31 and the outer flange 34 can be firmly fixed in the annular channel 216, so as to avoid the outer conductor 3 and the conductive body 2 generating a gap therebetween. Accordingly, stability of transferring of a current or a signal over the outer conductor 3 and the conductive body 2 can be assured, occurring of instantaneous interruption of power or interruption of signal also can be avoided.

Figure 24:
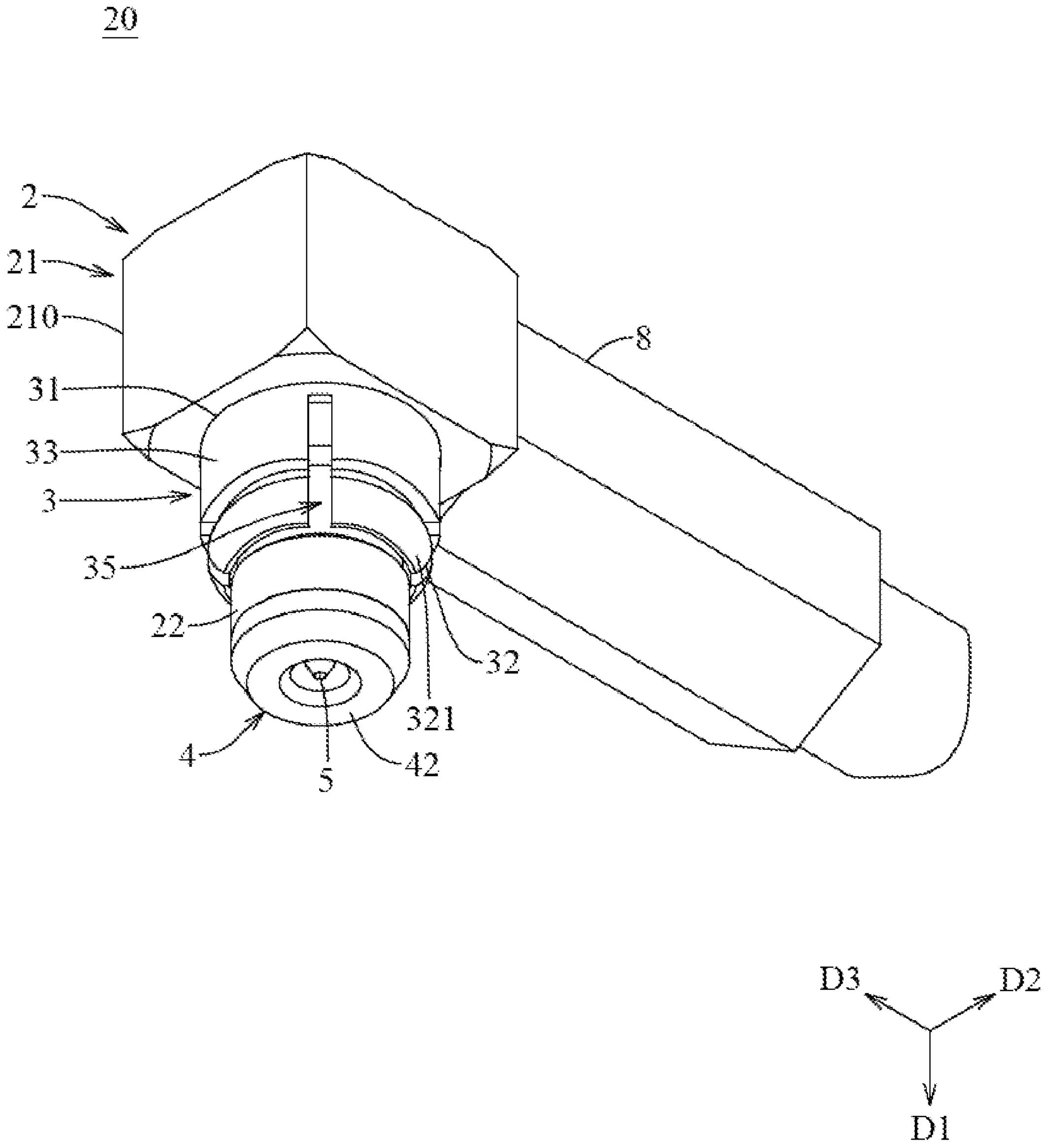
FIG. 24 is a perspective view of a plug connector of a ninth embodiment of the electrical connection device of the present disclosure.
Figure 25:
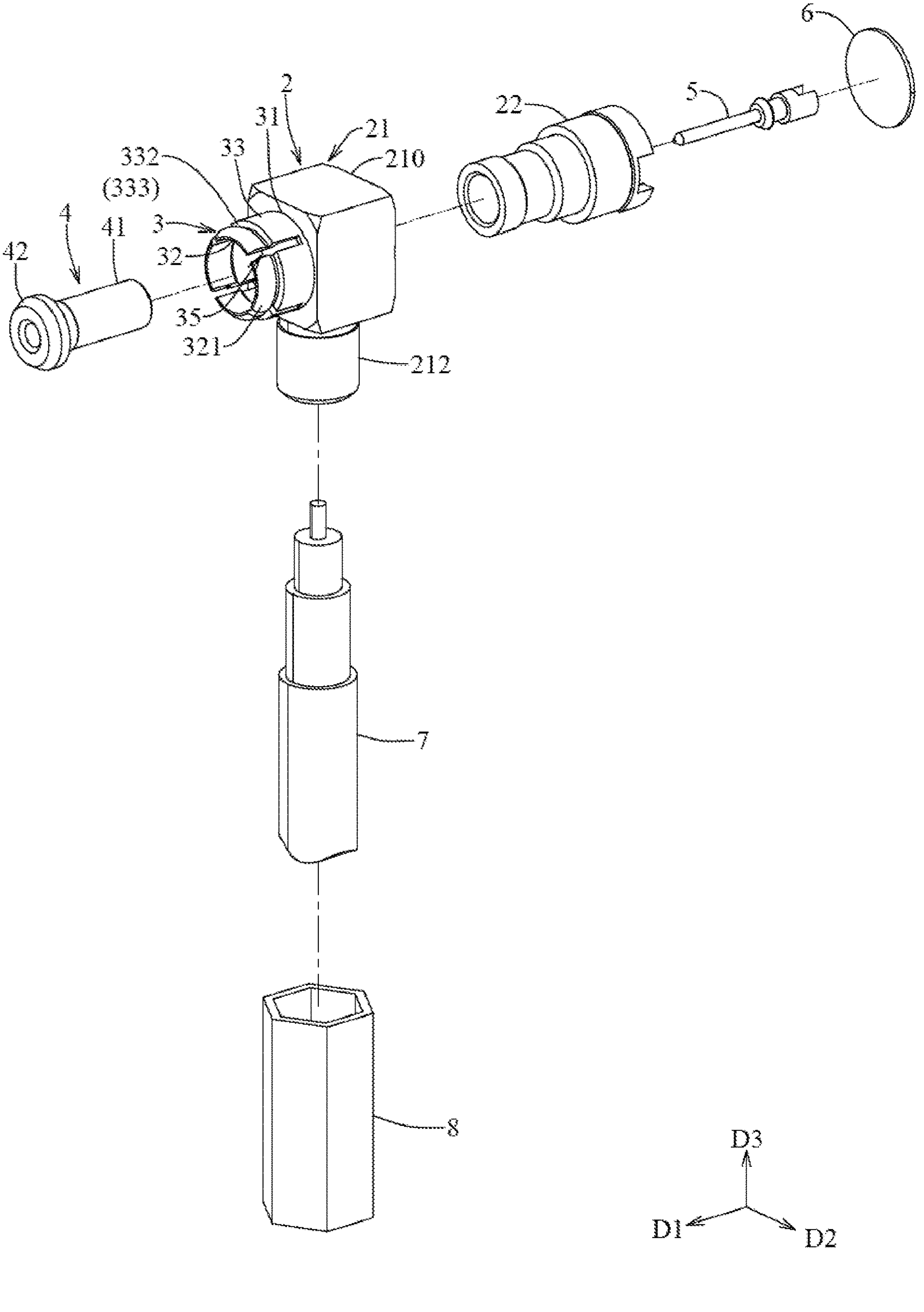
FIG. 25 is a perspective exploded view of the plug connector of the ninth embodiment.
Figure 26:
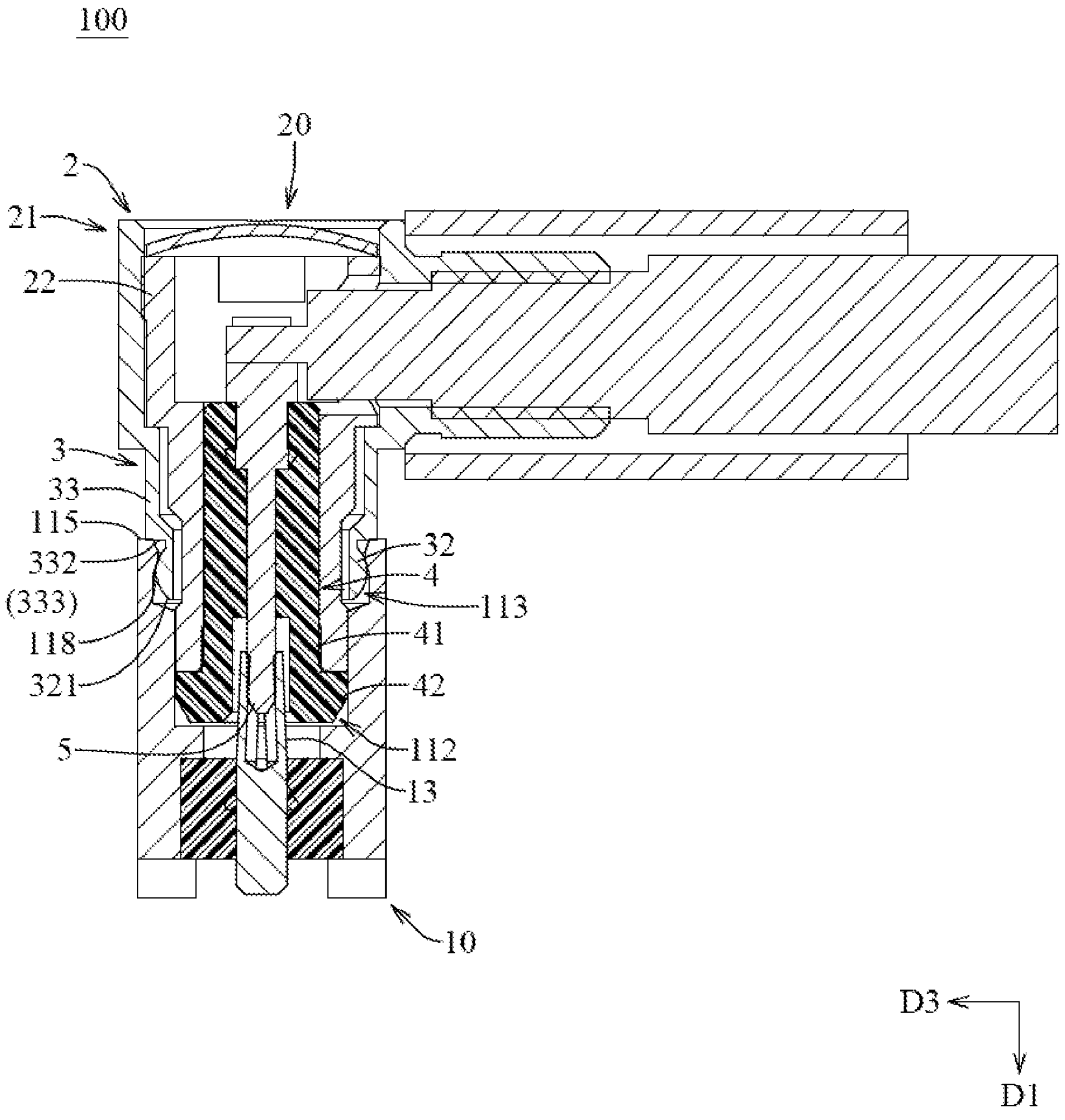
FIG. 26 is a cross sectional view of the ninth embodiment.

Referring to FIG. 24, FIG. 25 and FIG. 26, a ninth embodiment of the electrical connection device 100 of the present disclosure is substantially the same as fifth embodiment in entire structure, a difference therebetween lies in the plug connector 20.

The insulative body 4 is in form of hollow cylinder shape and has the providing segment 41 and the head segment 42 which is formed to the front end of the providing segment 41. The providing segment 41 of the insulative body 4 is provided in the second conductive member 22. The head segment 42 protrudes from the front end of the second conductive member 22, and is used to insert into the insertion groove 112. By that the head segment 42 surrounds the outer periphery of the central terminal 5, it can avoid the female terminal 13 of the receptacle connector 10 contacting a conductor except the central terminal 5 to cause a short circuit when a user obliquely improperly insert or pull out the plug connector 20.

Figure 27:
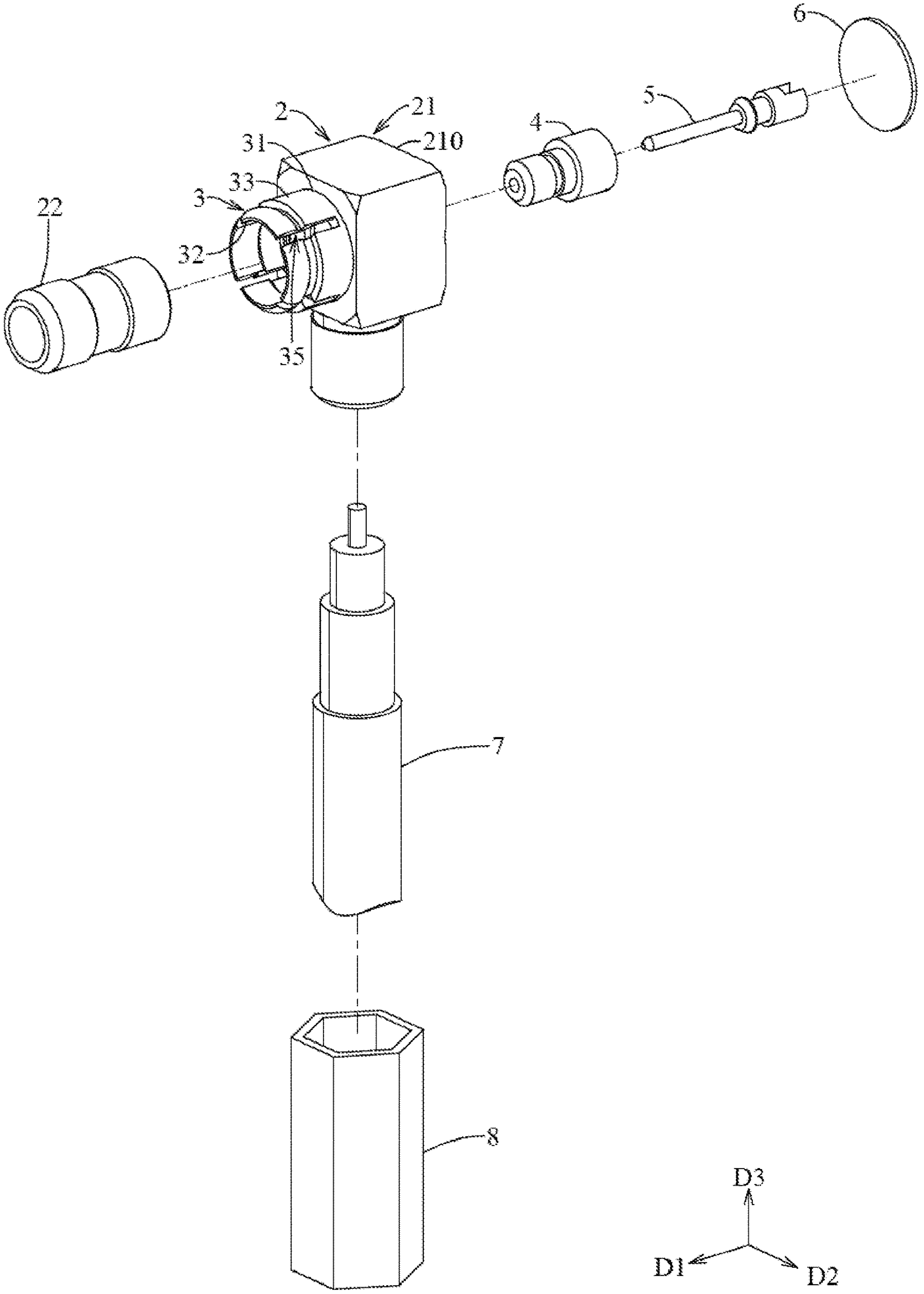
FIG. 27 is a perspective exploded view of a plug connector of a tenth embodiment of the electrical connection device of the present disclosure.
Figure 28:
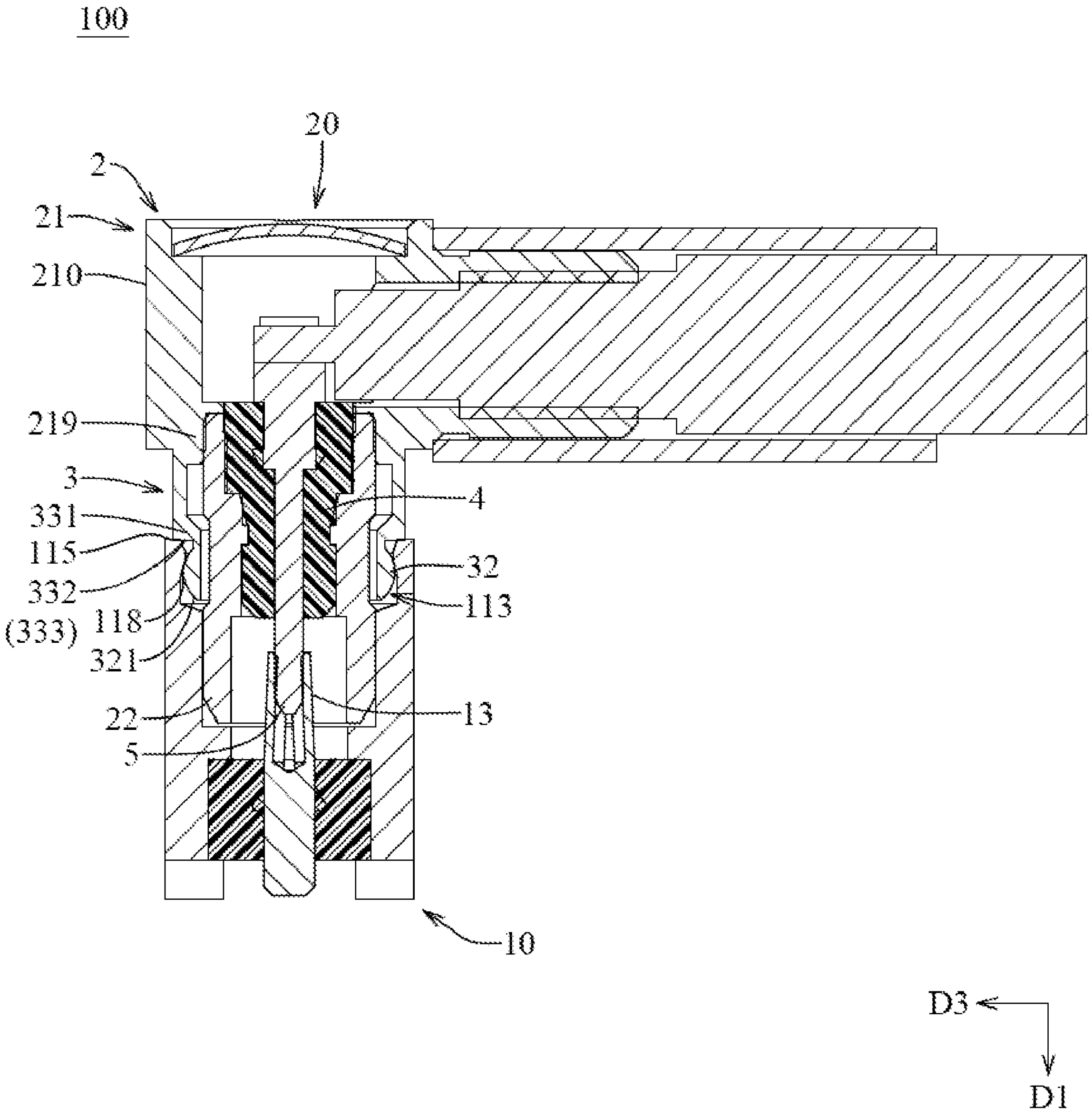
FIG. 28 is a cross sectional view of the tenth embodiment.

Referring to FIG. 27 and FIG. 28, a tenth embodiment of the electrical connection device 100 of the present disclosure is substantially the same as the fifth embodiment in entire structure, a difference therebetween lies in the plug connector 20.

The outer casing 210 of the first conductive member 21 has an inner interfering circumferential wall 219. The second conductive member 22 is assembled in the outer casing 210 of the first conductive member 21 from front to rear and interferes with the inner interfering circumferential wall 219. The second conductive member 22 is provided in the outer casing 210 of the first conductive member 21 and the outer conductor 3 and partially protrudes from the front ends of the plurality of front latching portions 32.

Figure 29:
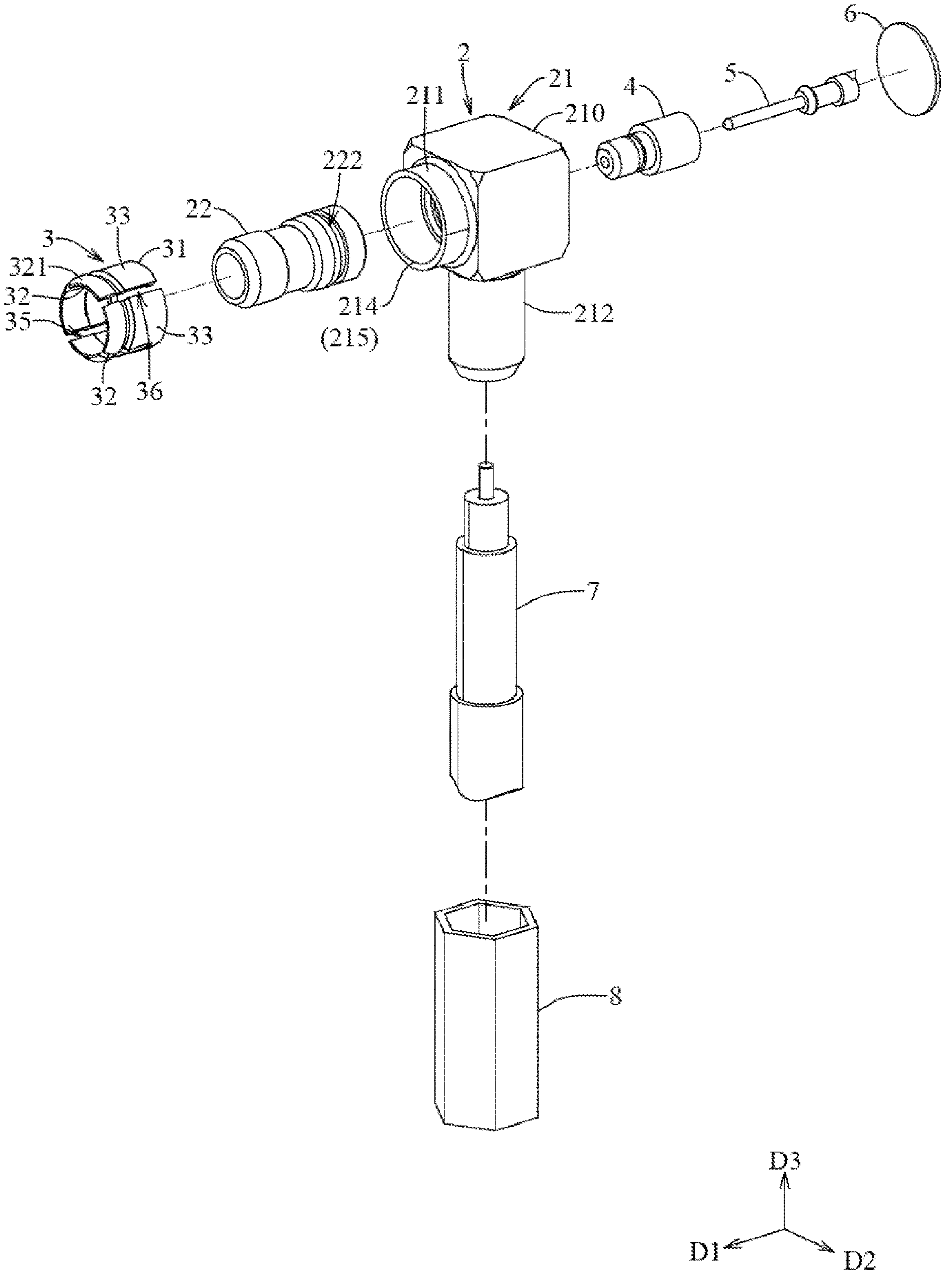
FIG. 29 is a perspective exploded view of a plug connector of an eleventh embodiment of the electrical connection device of the present disclosure.
Figure 30:
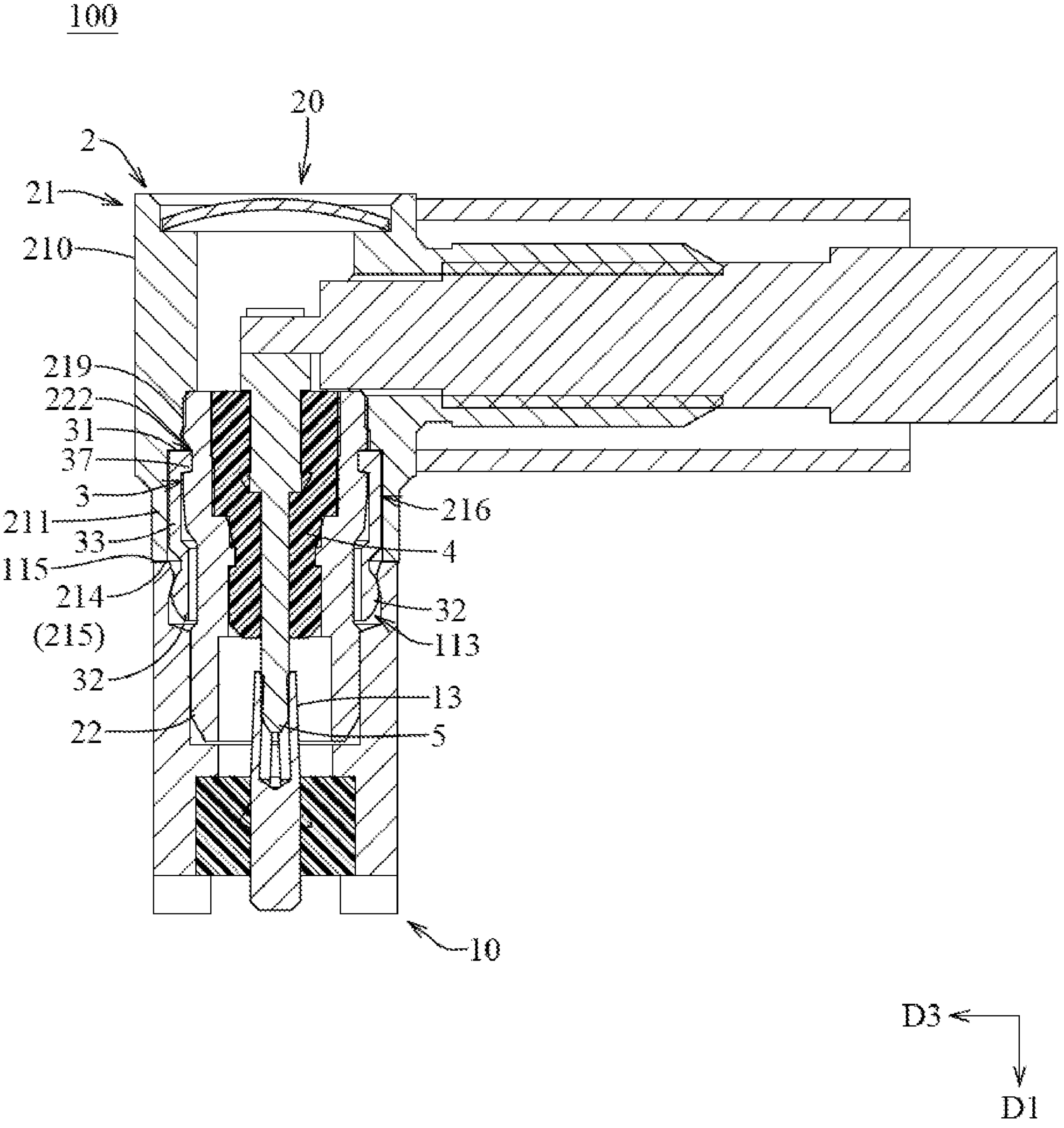
FIG. 30 is a cross sectional view of the eleventh embodiment.

Referring to FIG. 29 and FIG. 30, an eleventh embodiment of the electrical connection device 100 of the present disclosure is substantially the same as the first embodiment in entire structure, a difference therebetween lies in the plug connector 20.

The outer casing 210 of the first conductive member 21 has the inner interfering circumferential wall 219. The second conductive member 22 is assembled in the outer casing 210 of the first conductive member 21 from front to rear and interferes with the inner interfering circumferential wall 219. The second conductive member 22 is provided in the outer casing 210 and the annular surrounding wall 211 of the first conductive member 21 and partially protrudes from the front end surface 214. The second conductive member 22 is recessed radially to form an annular recessed groove 222 which is opened outwardly and is adjacent to the inner interfering circumferential wall 219. The first conductive member 21 and the second conductive member 22 together define the annular channel 216 which is opened forwardly and is communicated with the annular recessed groove 222.

The outer conductor 3 sheathes the second conductive member 22 and is formed with the penetrating gap 36. The rear end 31 and the plurality of elastic pieces 33 are received in the annular channel 216, the plurality of front latching portions 32 are exposed from the annular channel 216. The outer conductor 3 further has the inner flange 37 which is connected to the rear end 31, the inner flange 37 snaps to the annular recessed groove 222, the inner flange 37 applies an elastic force to clamp the second conductive member 22 by means of the tightening elastic force.

Figure 31:
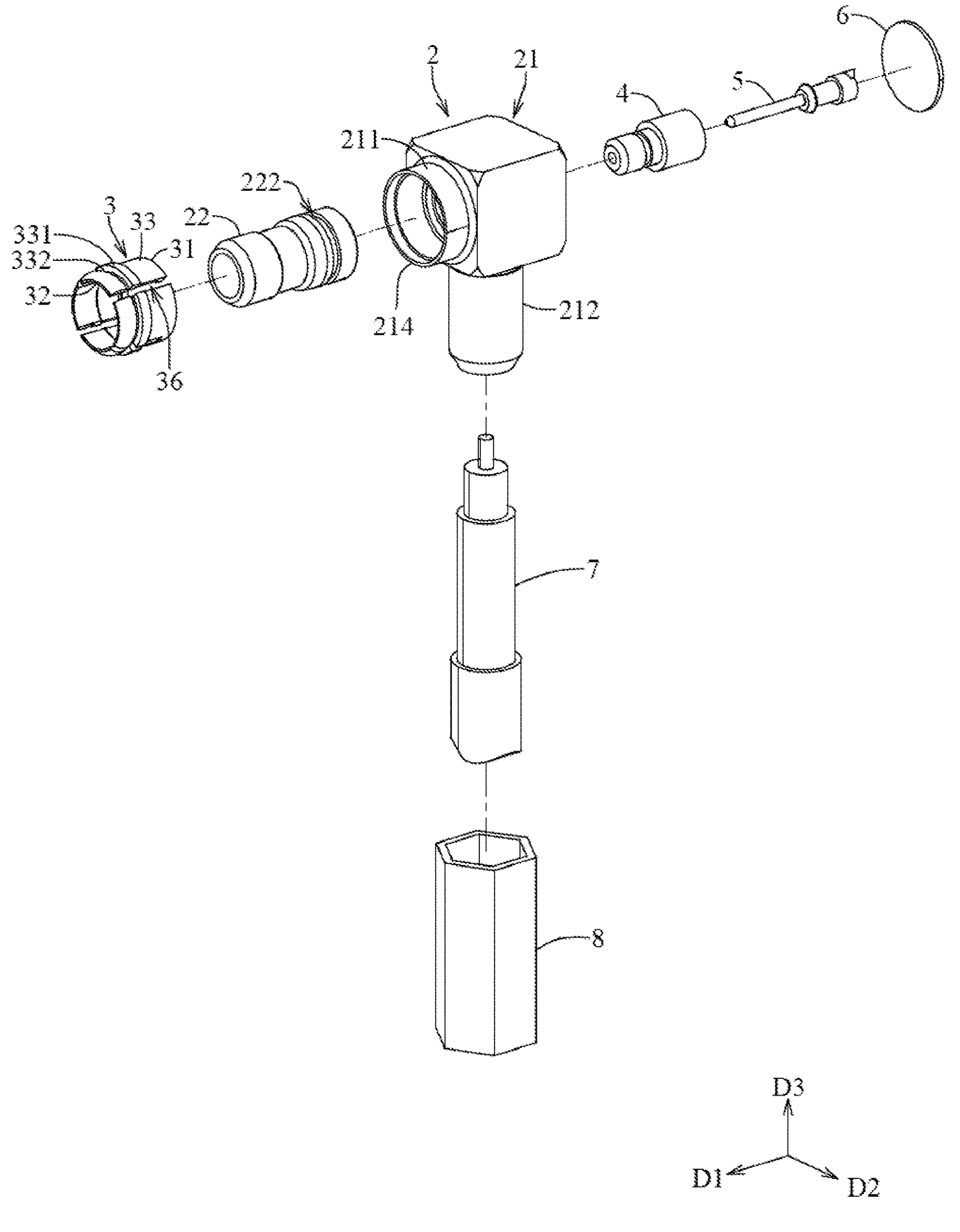
FIG. 31 is a perspective exploded view of a plug connector of a twelfth embodiment of the electrical connection device of the present disclosure.
Figure 32:
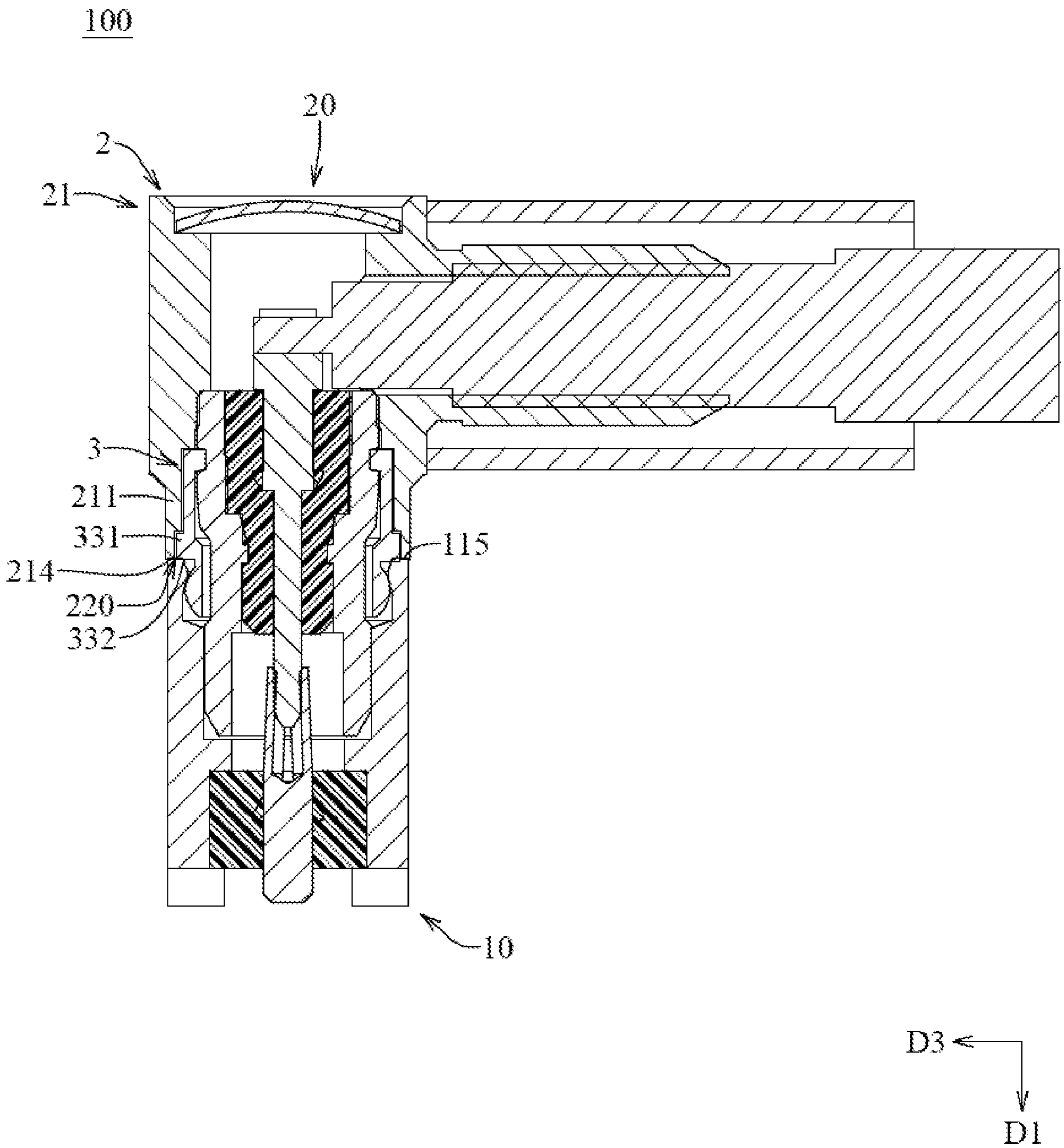
FIG. 32 is a cross sectional view of the twelfth embodiment.

Referring to FIG. 31 and FIG. 32, a twelfth embodiment of the electrical connection device 100 of the present disclosure is substantially the same as the eleventh embodiment in entire structure, a difference therebetween lies in the plug connector 20.

Each elastic piece 33 of the outer conductor 3 is similar to the fourth embodiment in structure, each elastic piece 33 similarly has the shoulder 331, the shoulder 331 has the shoulder surface 332. The shoulder surface 332 and the conductive body 2 of the front end surface 214 together form a stopping surface 220 which is used to abut against the mating end surface 115. Therefore, when the plug connector 20 mates with the receptacle connector 10, the conductive body 2 and the outer conductor 3 can tightly abut against the mating end surface 115 respectively by the front end surface 214 and the shoulder surface 332.

It is noted that, in another implementation of each of the third embodiment to the twelfth embodiment, each front latching portion 32 is the same as the second embodiment in structure, similarly has the front abutting surface 322 which is used to abut against the front stopping surface 119, so as to further promote firmness that the plug connector 20 mates with the receptacle connector 10.

In conclusion, in each embodiment of the electrical connection device 100, by that the outer conductor 3 and the conductive body 2 will not generate a gap therebetween, the stopping surface 215, 333, 220 and the mating end surface 115 will not generate a gap therebetween, and each elastic piece 33 has better elasticity, endure repeated inserting and pulling out and is not prone to deform, stability of transferring of a current or a signal can be assured, occurring of instantaneous interruption of power or interruption of signal also can be avoided, so it indeed can achieve an object of the present disclosure.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device comprising:
- a plug connector comprising:
  - a conductive body;
  - an outer conductor which has a rear end, at least one front latching portion, and at least one elastic piece, the rear end being electrically connected to the conductive body, the front latching portion being opposite to the rear end and being positioned in front of the rear end, the elastic piece being positioned between the rear end and the front latching portion, at least one of the conductive body and the outer conductor being formed with a stopping surface to abut against a mating end surface of a receptacle connector when the plug connector mates with the receptacle connector, a position of the stopping surface corresponding to the elastic piece of the outer conductor and being closer to the front latching portion than to the rear end of the outer conductor;

an insulative body which is provided in the conductive body; and a central terminal which is provided in the insulative body.

2. The electrical connection device of claim 1, wherein the elastic piece is formed with the stopping surface.

3. The electrical connection device of claim 2, wherein the elastic piece has a shoulder, the shoulder has a shoulder surface, and the shoulder surface forms the stopping surface.

4. The electrical connection device of claim 1, wherein the conductive body has an annular surrounding wall which extends forwardly and surrounds the elastic piece, the annular surrounding wall has a front end surface, and the front end surface forms the stopping surface.

5. The electrical connection device of claim 1, wherein the elastic piece has a shoulder, the shoulder has a shoulder surface, the conductive body has an annular surrounding wall which extends forwardly and surrounds the elastic piece, the annular surrounding wall has a front end surface, and the shoulder surface and the front end surface together form the stopping surface.

6. The electrical connection device of claim 1, wherein the outer conductor is formed with at least one slit, the at least one slit extends from the front latching portion towards the rear end, and at least one the slit has an opened portion which is positioned to the front latching portion and a closed portion which is opposite to the opened portion and closer to the rear end than to the front latching portion of the outer conductor.

7. The electrical connection device of claim 6, wherein the outer conductor has a plurality of front latching portions and a plurality of elastic pieces and is formed with a plurality of slits, each slit extends from between two corresponding adjacent front latching portions towards the rear end, each slit is positioned between the two corresponding adjacent front latching portions and between the two corresponding adjacent elastic pieces.

8. The electrical connection device of claim 7, wherein the outer conductor is further formed with a penetrating gap, the penetrating gap extends from the two corresponding adjacent front latching portions to the rear end, the penetrating gap has two through opening portions, and the two through opening portions are respectively positioned between the two corresponding adjacent front latching portions and at the rear end.

9. The electrical connection device of claim 1, wherein the outer conductor is formed with a penetrating gap, the penetrating gap extends from the front latching portion to the rear end, and the penetrating gap has two through opening portions which are respectively positioned to the front latching portion and the rear end.

10. The electrical connection device of claim 1, wherein the conductive body is a single-piece component and is formed with an annular recessed groove which is opened outwardly, and the outer conductor sheathes the conductive body and is formed with a penetrating gap, the penetrating gap extends from the front latching portion to the rear end, the outer conductor has an inner flange which is connected to the rear end, and the inner flange snaps to the annular recessed groove and applies an elastic force to clamp the conductive body.

11. The electrical connection device of claim 1, wherein the conductive body is a single-piece component, the rear end of the outer conductor is integrally connected to the conductive body, the outer conductor and the conductive body are integrally formed and together constitute a single-piece component, and the insulative body has a providing segment which is provided in the conductive body and the outer conductor and a head segment which is formed to a front end of the providing segment and protrudes from a front end of the front latching portion.

12. The electrical connection device of claim 1, wherein the conductive body is a single-piece component and is formed with an annular channel which is opened forwardly, and the outer conductor is formed with a penetrating gap which extends from the front latching portion to the rear end, the outer conductor sheathes the conductive body and applies an elastic force to clamp the conductive body, the rear end and the elastic piece are received in the annular channel, and the front latching portion is exposed from the annular channel.

13. The electrical connection device of claim 12, wherein the outer conductor has a plurality of front latching portions and a plurality of elastic pieces and is formed with a plurality of slits, the penetrating gap extends from two corresponding adjacent front latching portions to the rear end, and each slit extends from the two corresponding adjacent front latching portions towards the rear end, each slit is positioned between the two corresponding adjacent front latching portions and between the two corresponding adjacent elastic pieces, and each elastic piece has a first elastic piece body which is connected to the corresponding front latching portion and a second elastic piece body which extends rearwardly from the first elastic piece body and applies an elastic force to abut against the conductive body.

14. The electrical connection device of claim 1, wherein the conductive body is a single-piece component and is formed with an annular channel which is opened forwardly, the outer conductor further has an outer flange which is connected to the rear end, the outer conductor sheathes the conductive body, and the rear end and the outer flange are received in the annular channel, the conductive body has an annular latch pressuring wall which extends forwardly and surrounds the annular channel, and a front end of the annular latch pressuring wall is deformed to bend inwardly and latch and press against the outer flange.

15. The electrical connection device of claim 1, wherein the conductive body has a first conductive member and a second conductive member which is provided in the first conductive member and partially protrudes from a front end of the first conductive member, the first conductive member and the second conductive member together define an annular channel which is opened forwardly, the outer conductor further has an outer flange which is connected to the rear end, and the rear end, the elastic piece, and the outer flange are received in the annular channel, the front latching portion is exposed from the annular channel and protrudes from the front end of the first conductive member, and the outer flange is clamped by the first conductive member and the second conductive member.

16. The electrical connection device of claim 1, wherein the conductive body has a first conductive member, a second conductive member which is provided in the first conductive member and partially protrudes from a front end of the first conductive member, and a third conductive member which is provided in the first conductive member and partially protrudes from a rear end of the first conductive member, the first conductive member and the second conductive member together define an annular channel which is opened forwardly, the outer conductor further has an outer flange which is connected to the rear end of the outer conductor, and the rear end of the outer conductor, the elastic piece, and the outer flange are received in the annular channel, the front latching portion is exposed from the annular channel and protrudes from the front end of the first conductive member, and the outer flange is clamped by the first conductive member and the second conductive member.

17. The electrical connection device of claim 1, wherein the conductive body has a first conductive member and a second conductive member, the rear end of the outer conductor is integrally connected to the first conductive member, the outer conductor and the first conductive member are integrally formed and together constitute a single-piece component, and the second conductive member is provided in the first conductive member and the outer conductor and partially protrudes from a front end of the front latching portion.

18. The electrical connection device of claim 1, wherein the conductive body has a first conductive member and a second conductive member, the rear end of the outer conductor is integrally connected to the first conductive member, the outer conductor and the first conductive member are integrally formed and together constitute a single-piece component, the second conductive member is provided in the first conductive member and the outer conductor and partially protrudes from a front end of the front latching portion, and the insulative body has a providing segment which is provided in the second conductive member and a head segment which is formed to a front end of the providing segment and protrudes from a front end of the second conductive member.

19. The electrical connection device of claim 1, wherein the conductive body has a first conductive member and a second conductive member, the rear end of the outer conductor is integrally connected to the first conductive member, the outer conductor and the first conductive member are integrally formed and together constitute a single-piece component, the second conductive member is provided in the first conductive member and the outer conductor and partially protrudes from a front end of the front latching portion, and the first conductive member has an inner interfering circumferential wall which interferes with the second conductive member.

20. The electrical connection device of claim 1, wherein the conductive body has a first conductive member and a second conductive member which is provided in the first conductive member and partially protrudes from a front end of the first conductive member, the first conductive member has an inner interfering circumferential wall, the second conductive member interferes with the inner interfering circumferential wall and is formed with an annular recessed groove which is opened outwardly, the first conductive member and the second conductive member together define an annular channel which is opened forwardly and is communicated the annular recessed groove, the outer conductor sheathes the second conductive member and is formed with a penetrating gap, the penetrating gap extends from the front latching portion to the rear end, and the outer conductor further has an inner flange which is connected to the rear end, and the rear end, the elastic piece, and the inner flange are received in the annular channel, the front latching portion is exposed from the annular channel, and the inner flange snaps to the annular recessed groove and applies an elastic force to clamp the second conductive member.

* * * * *